(12) United States Patent
Saito

(10) Patent No.: US 10,044,884 B2
(45) Date of Patent: Aug. 7, 2018

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Tomoaki Saito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/353,607

(22) Filed: Nov. 16, 2016

(65) Prior Publication Data
US 2017/0374211 A1  Dec. 28, 2017

(30) Foreign Application Priority Data
Jun. 27, 2016 (JP) .................................. 2016-126578

(51) Int. Cl.
| H04N 1/04 | (2006.01) |
| H04N 1/00 | (2006.01) |
| G06F 3/12 | (2006.01) |

(52) U.S. Cl.
CPC ....... H04N 1/00411 (2013.01); G06F 3/1286 (2013.01); *H04N 2201/0094* (2013.01)

(58) Field of Classification Search
CPC ..... H04N 2201/001; H04N 2201/0039; H04N 2201/0094; H04N 2201/3208; H04N 2201/3226; H04N 1/00326; H04N 1/4406; G03G 15/5075; G03G 15/502; G03G 15/55; G03G 15/553; G03G 2215/00109; G06F 17/30
USPC ... 358/1.15, 1.16, 403, 1.13, 1.14, 401, 440; 709/226
See application file for complete search history.

(56) References Cited

U.S. PATENT DOCUMENTS

| 8,438,079 | B1 * | 5/2013 | Nguyen | ............. | G06Q 30/0641 705/26.41 |
| 9,027,099 | B1 * | 5/2015 | Saylor | .................... | G06F 21/36 705/64 |
| 9,331,856 | B1 | 5/2016 | Song | | |
| 2004/0232221 | A1 | 11/2004 | Beenau et al. | | |

(Continued)

FOREIGN PATENT DOCUMENTS

| JP | 2008-251050 A | 10/2008 |
| JP | 2012-022406 A | 2/2012 |

OTHER PUBLICATIONS

Oct. 3, 2017 Office Action issued in U.S. Appl. No. 15/345,917.

(Continued)

*Primary Examiner* — Negussie Worku
(74) *Attorney, Agent, or Firm* — Oliff PLC

(57) ABSTRACT

An information processing apparatus includes a communication unit, a display, and a remote operation unit. The communication unit communicates with an external device. The display displays information, and receives an input operation. The remote operation unit remotely operates a screen displayed on the external device. The remote operation unit operates the external device in a state in which at least one operation on the external device are invalidated. In the case where a drawing input operation is performed on the display with the screen displayed on the external device displayed on the display, the remote operation unit validates an operation corresponding to the drawing input operation, among the at least one operation on the external device which have been invalidated.

8 Claims, 17 Drawing Sheets

(56) References Cited

U.S. PATENT DOCUMENTS

| | | |
|---|---|---|
| 2006/0000896 A1 | 1/2006 | Bonalle et al. |
| 2006/0244993 A1* | 11/2006 | Konnai ................. G06F 3/1204 358/1.15 |
| 2008/0137125 A1* | 6/2008 | Naitoh ................ H04L 41/0816 358/1.14 |
| 2009/0013027 A1* | 1/2009 | Tanaka ................... G06F 21/10 709/203 |
| 2011/0162062 A1* | 6/2011 | Kumar ................... G06F 21/10 726/15 |
| 2012/0007818 A1 | 1/2012 | Koga |
| 2013/0063758 A1* | 3/2013 | Saito ..................... G06K 15/00 358/1.14 |
| 2014/0211238 A1* | 7/2014 | Nakajima ............. G06F 3/1238 358/1.14 |
| 2014/0253969 A1 | 9/2014 | Okigami |
| 2014/0333960 A1* | 11/2014 | Fukasawa .......... G06K 15/1817 358/1.15 |
| 2015/0103375 A1* | 4/2015 | Mihira .................. G06F 3/1288 358/1.15 |
| 2015/0104200 A1 | 4/2015 | Matsumoto |
| 2015/0153984 A1 | 6/2015 | Furushige et al. |
| 2015/0153988 A1 | 6/2015 | Tabuki et al. |
| 2015/0193037 A1* | 7/2015 | Masaki ............... G06F 3/03545 345/173 |
| 2015/0234624 A1* | 8/2015 | Nii ........................ G06F 3/1238 358/1.14 |
| 2015/0281501 A1 | 10/2015 | Araki et al. |
| 2015/0324159 A1* | 11/2015 | Sugaya ................... H04L 67/02 358/1.15 |
| 2016/0021271 A1 | 1/2016 | Otake et al. |
| 2016/0105307 A1* | 4/2016 | Kujirai .................. H04L 41/046 709/226 |
| 2016/0269574 A1* | 9/2016 | Takahashi .......... H04N 1/00212 |
| 2017/0064121 A1 | 3/2017 | Matsuda et al. |
| 2017/0070640 A1 | 3/2017 | Kondoh |
| 2017/0201850 A1* | 7/2017 | Raleigh ................. H04W 4/001 |
| 2017/0222984 A1* | 8/2017 | Kanekar ............. H04L 63/0428 |

OTHER PUBLICATIONS

May 16, 2017 Office Action Issued in U.S. Appl. No. 15/345,917.

U.S. Appl. No. 15/345,917, filed Nov. 8, 2016 in the name of Tomoaki Saito.

\* cited by examiner

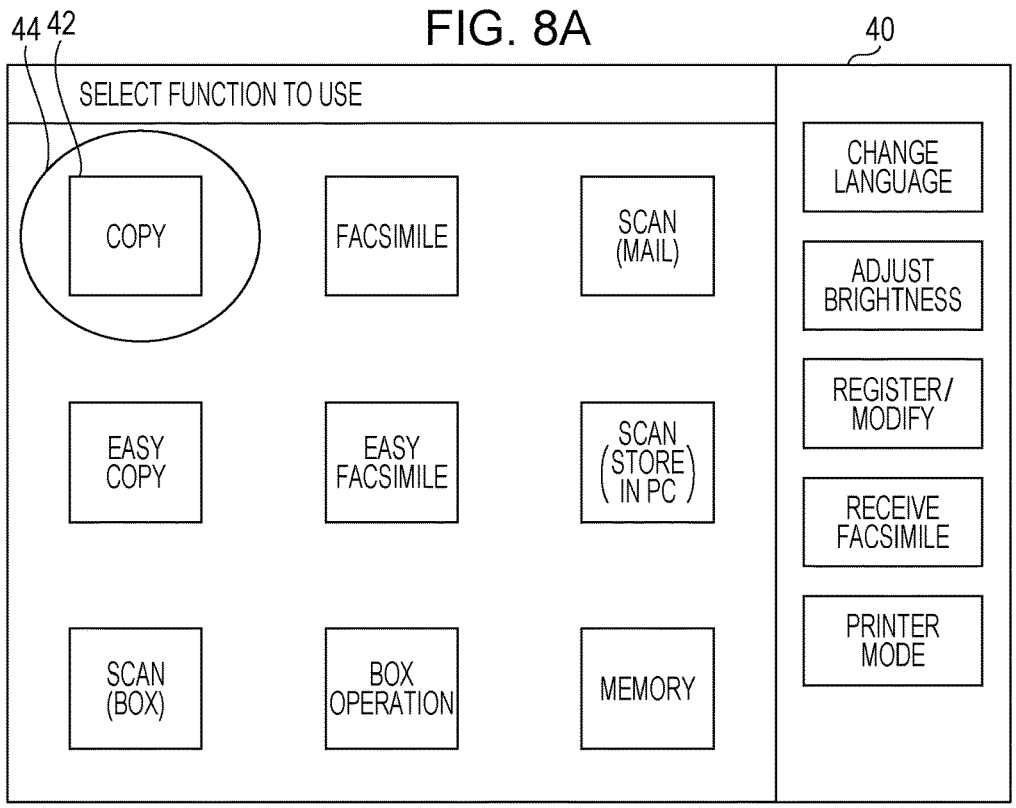
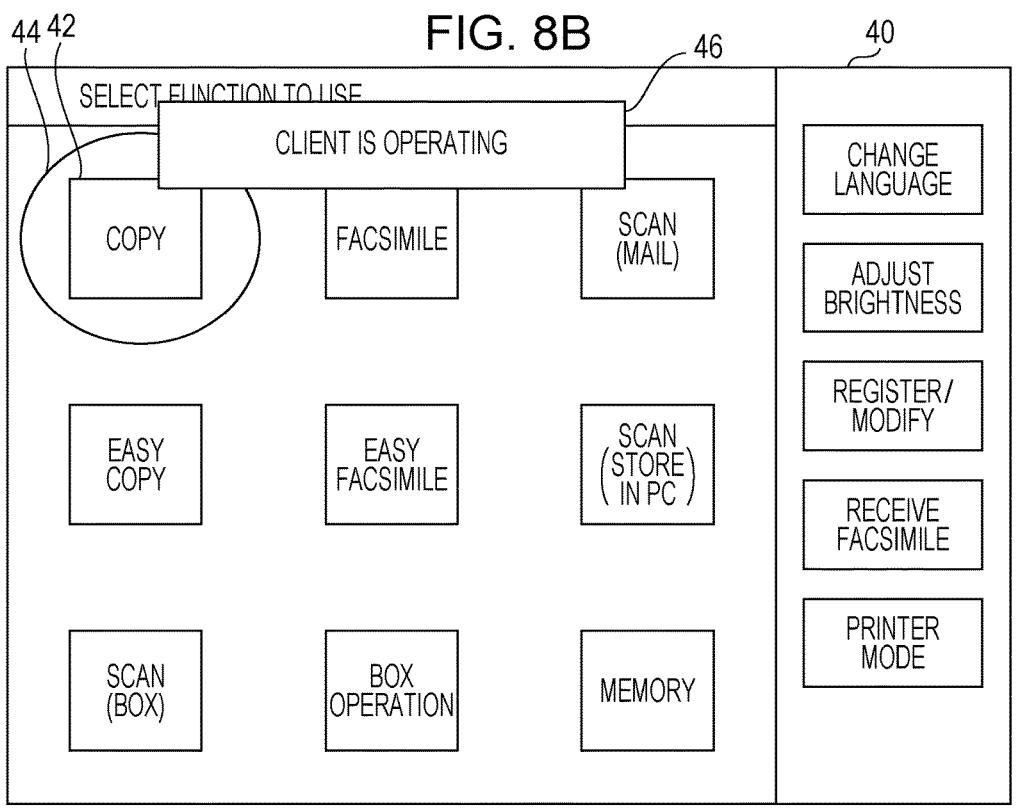

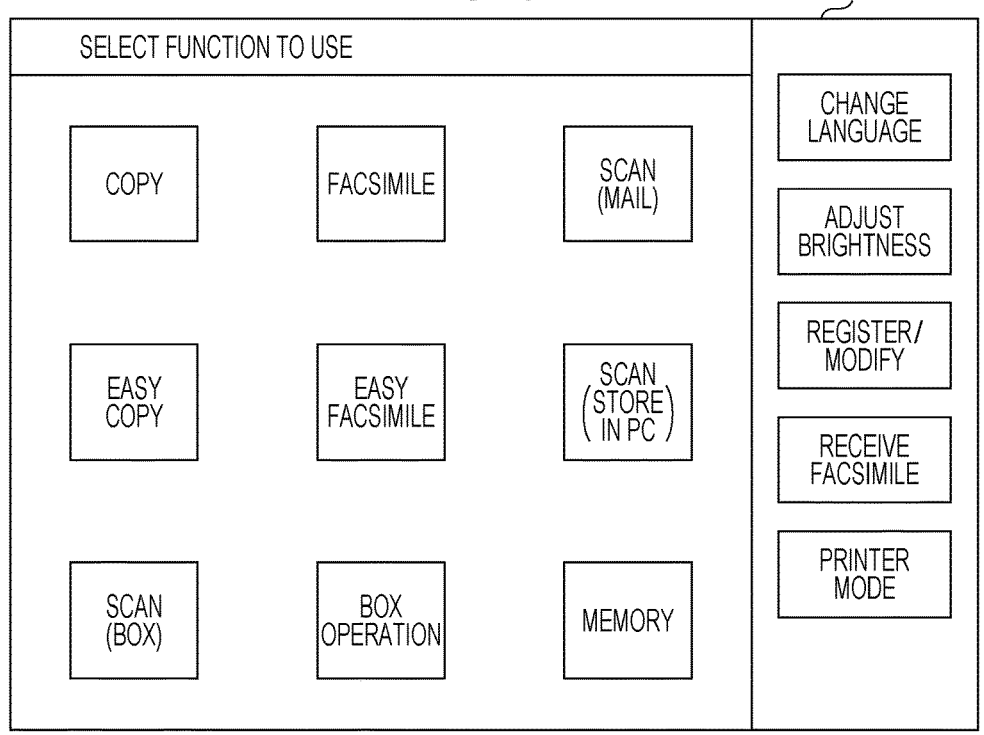
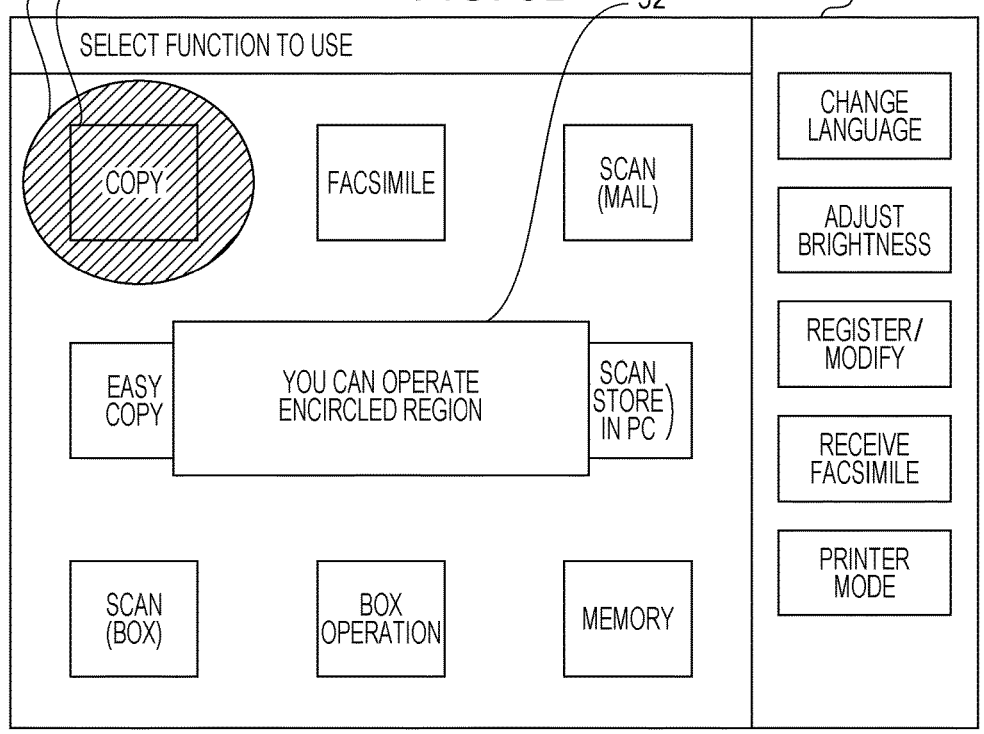

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-126578 filed Jun. 27, 2016.

BACKGROUND (i) Technical Field

The present invention relates to an information processing apparatus and a non-transitory computer readable medium.

(ii) Related Art

Occasionally, plural devices communicate with each other with one of the devices remotely operating another. In such a case, an operation on the device having the operation authority may be received, and an operation on the device not having the operation authority may not be received.

SUMMARY

According to an aspect of the present invention, there is provided an information processing apparatus including: a communication unit that communicates with an external device; a display that displays information and that receives an input operation; and a remote operation unit that remotely operates a screen displayed on the external device, in which the remote operation unit operates the external device in a state in which at least one of operations on the external device is invalidated, and in a case where a drawing input operation is performed on the display with the screen displayed on the external device displayed on the display, validates an operation corresponding to the drawing input operation, among the at least one operation on the external device which have been invalidated.

BRIEF DESCRIPTION OF THE DRAWINGS

An exemplary embodiment of the present invention will be described in detail based on the following figures, wherein:

FIGS. 8A to 8C illustrate an example of screen transition in the terminal device;

FIGS. 9A to 9C illustrate an example of screen transition in the image forming device;

DETAILED DESCRIPTION

Figure 1:
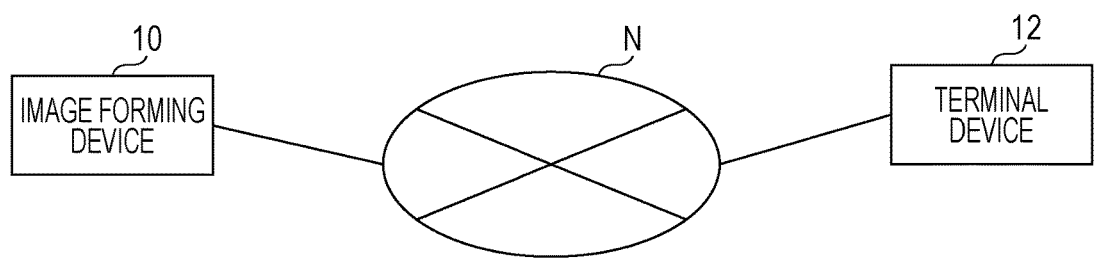
FIG. 1 is a block diagram illustrating an image forming system according to an exemplary embodiment of the present invention.

An image forming system that serves as an information processing system according to an exemplary embodiment of the present invention will be described with reference to FIG. 1. FIG. 1 illustrates an example of the image forming system according to the exemplary embodiment. The image forming system includes an image forming device 10 and a terminal device 12. The image forming device 10 and the terminal device 12 communicate with each other via a communication path N such as a network. In the example illustrated in FIG. 1, one image forming device 10 is included in the image forming system. However, plural image forming devices 10 may be included in the image forming system. As a matter of course, other devices may be included in the image forming system.

The image forming device 10 is a device that includes an image forming function. Specifically, the image forming device 10 is a device that includes at least one of a scan function, a print function, a copy function, and a facsimile function. The image forming device 10 also includes a function of transmitting and receiving data to and from other devices.

The terminal device 12 is a device such as a personal computer (PC), a tablet PC, a smartphone, and a cellular phone, and includes a function of transmitting and receiving data to and from other devices.

In the image forming system according to the exemplary embodiment, the terminal device 12 includes a function of remotely operating the image forming device 10. In this case, the terminal device 12 corresponds to an example of the information processing apparatus, and the image forming device 10 corresponds to an example of the external device. As a matter of course, the image forming device 10 may include a function of remotely operating the terminal device 12. In this case, the image forming device 10 corresponds to an example of the information processing apparatus, and the terminal device 12 corresponds to an example of the external device.

A case where the terminal device 12 has the function of remotely operating the image forming device 10 will be described below. The terminal device 12 is provided at a customer center for the image forming device 10, and used by an operator at the customer center (e.g. a person who manages the image forming device 10), for example. It is assumed that a user (e.g. a customer) of the image forming device 10 and the operator at the customer center communicate with each other by telephone, through a video conference system, or the like, and that the operator explains a method of operating the image forming device 10 to the customer or instructs the customer how to operate the image forming device 10, for example. It is assumed that the operator remotely operates the image forming device 10 using the terminal device 12 in such situations.

Figure 2:
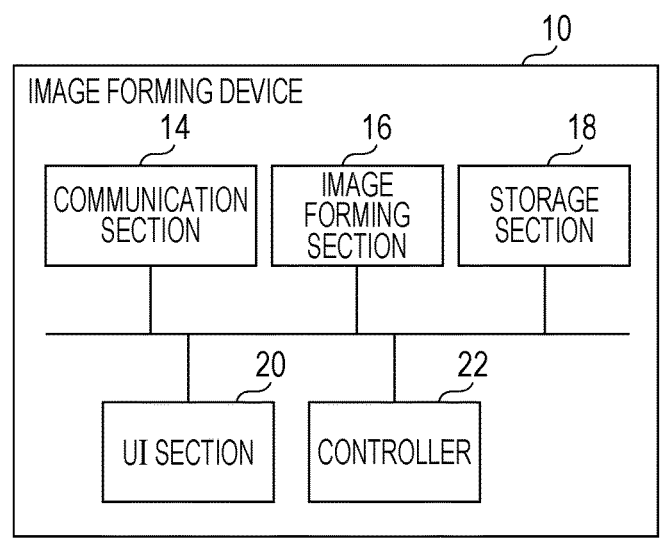
FIG. 2 is a block diagram illustrating an image forming device according to the exemplary embodiment.

The configuration of the image forming device 10 will be described in detail below with reference to FIG. 2. FIG. 2 illustrates the configuration of the image forming device 10.

A communication section 14 is a communication interface, and includes a function of transmitting data to other devices and a function of receiving data from other devices via the communication path N. The communication section 14 may be a communication interface that includes a wireless communication function, or may be a communication interface that includes a wired communication function.

An image forming section 16 performs an image forming process. For example, the image forming section 16 executes at least one of a scan function, a print function, a copy function, and a facsimile function. When the scan function is executed, a document is read to generate scan data (image data). When the print function is executed, an image is printed on a recording medium such as paper. When the copy function is executed, a document is read to be printed on a recording medium. When the facsimile function is executed, image data are transmitted or received by facsimile. The image data may be image data generated by reading a document, or may be image data transmitted from other devices. A composite function obtained by combining plural functions may be executed. For example, a scan-transfer function obtained by combining the scan function and a transmission function (transfer function) may be executed. When the scan-transfer function is executed, a document is read to generate scan data (image data), and the scan data are transmitted to a transmission destination. As a matter of course, such a combined function is merely exemplary, and different combined functions may be executed.

A storage section 18 is a storage device such as a hard disk. The storage section 18 stores execution instruction information (e.g. job information) that indicates an instruction to execute the image forming process, image data to be printed, scan data generated by executing the scan function, various control data, various programs, terminal address information that indicates the address of the terminal device 12, information that indicates the amount to be billed, the number of times of reception of execution of a process corresponding to the billing, information on resources that have been used (e.g. the count of sheets of paper), and so forth. As a matter of course, such information may be stored in separate storage devices, or may be stored in one storage device.

A user interface (UI) section 20 includes a display section and an operation section. The display section is a display device such as a liquid crystal display. The operation section is an input device such as a touch screen and a keyboard, and receives various operations including a remote operation.

A controller 22 controls operation of the various components of the image forming device 10. For example, the controller 22 has a function of invalidating at least one of operations on the UI section 20, and canceling the invalidation of operations on the UI section 20 and validating the operations. For example, under control by the terminal device 12, operations on the UI section 20 are set to be invalid or valid.

Examples of a state in which operations on the UI section 20 are invalid include a state in which such operations are not received by the UI section 20 and a state in which no reaction is given to such operations. For example, in the case where a button image (images such as icons and keys are included in the category of the button images) is displayed on the display section of the UI section 20 and operations on the UI section 20 are invalid, a user's operation of pressing the button image is not received by the UI section 20, and no reaction is given to the operation. In the case where operations on the UI section 20 are invalid and the user touches the screen of the display section of the UI section 20, a message saying "Operation is invalid." or the like may be displayed on the display section of the UI section 20. The button image is an image that allows the user to provide an instruction for a specific process, command, or the like or make a specific input. Examples of the button image include an icon for providing an instruction to execute an image forming process (such as scanning and copying), an image that represents a start button, and an image for setting parameters.

Examples of a state in which operations on the UI section 20 are valid include a state in which such operations are received by the UI section 20 and a state in which a reaction is given to such operations. For example, when a button image displayed on the display section of the UI section 20 is pressed by the user, the operation is received by the UI section 20, and a process or the like corresponding to the button image is executed.

In the exemplary embodiment, when a specific drawing input operation is performed on the terminal device 12 with at least one of operations on the UI section 20 invalidated, an operation corresponding to the drawing input operation, among the at least one operation on the UI section 20 which has been invalidated, is set to be valid. Examples of the specific drawing input operation include an operation of encircling a button image, an input field, or the like displayed on the display section with a specific figure and an operation of designating a button image, an input field, or the like with a specific figure. Examples of the specific figure include a circle, an ellipse, a rectangle, a straight line, a polygonal line, a curve, and an arrow.

Figure 3:
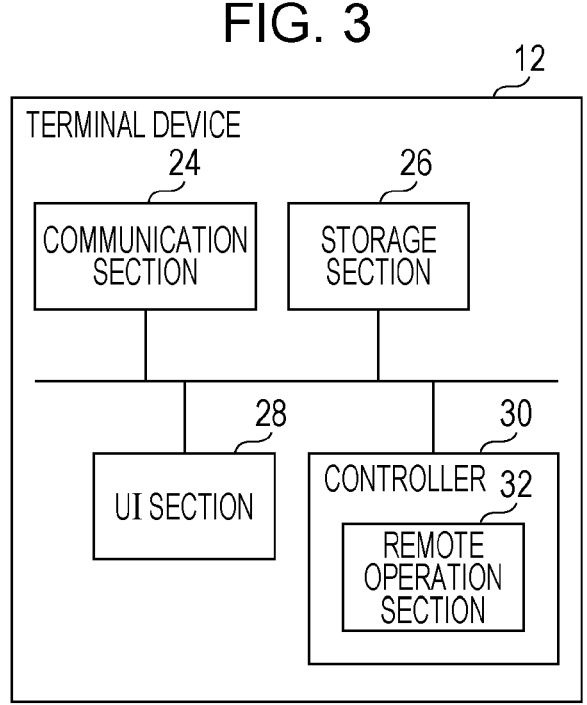
FIG. 3 is a block diagram illustrating a terminal device according to the exemplary embodiment.

The configuration of the terminal device 12 will be described in detail below with reference to FIG. 3. FIG. 3 illustrates the configuration of the terminal device 12.

A communication section 24 is a communication interface, and includes a function of transmitting data to other devices and a function of receiving data from other devices via the communication path N. The communication section 24 may be a communication interface that includes a wireless communication function, or may be a communication interface that includes a wired communication function.

The storage section 26 is a storage device such as a hard disk, and stores various programs, various data, device address information that indicates the address of the image forming device 10, and so forth.

A user interface (UI) section 28 includes a display section and an operation section. The display section is a display device such as a liquid crystal display. The operation section is an input device such as a touch screen, a keyboard, and a mouse.

A controller 30 controls operation of the various components of the terminal device 12. The controller 30 includes a remote operation section 32. The remote operation section 32 includes a function of remotely communicating with the image forming device 10 via the communication path N, and remotely operating the image forming device 10. For example, the remote operation section 32 receives data on a screen being displayed on the UI section 20 of the image forming device 10 from the image forming device 10, and causes the UI section 28 of the terminal device 12 to display the screen. Consequently, in a remote communication state, the screen being displayed on the image forming device 10 is shared by the terminal device 12. The terminal device 12 may display the same screen as the screen being displayed on the image forming device 10, or may display a screen prepared by customizing (such as modifying or processing) the screen being displayed on the image forming device 10 for the terminal device 12. The remote operation section 32 also controls the authority to operate the UI section 20 of the image forming device 10. That is, the remote operation section 32 has a function of transferring the operation authority from the image forming device 10 to the terminal device 12, and transferring the operation authority from the terminal device 12 to the image forming device 10. On the device to which the operation authority has been transferred, that is, the device having the operation authority, an operation on the UI section 20 of the image forming device 10 is valid. On the device from which the operation authority has been transferred, that is, the device not having the operation authority, such an operation is invalid. An operation may be received on the device having the operation authority, and an operation may not be received on the device not having the operation authority. In the case where the terminal device 12 has the operation authority, an operation on the image forming device 10 through the UI section 28 of the terminal device 12 is valid. In the case where the terminal device 12 does not have the operation authority, an operation on the image forming device 10 through the UI section 28 of the terminal device 12 is invalid.

In the exemplary embodiment, in the case where a specific drawing input operation is performed on the screen of the display section of the UI section 28 of the terminal device 12 with at least one of operations on the UI section 20 of the image forming device 10 invalidated in the remote communication state, the remote operation section 32 controls the image forming device 10 so as to validate an operation corresponding to the drawing input operation, among the at least one operation on the UI section 20 of the image forming device 10 which has been invalidated. For example, the remote operation section 32 validates an operation corresponding to a position at which the specific drawing input operation has been performed on the screen of the display section of the UI section 28, among the at least one operation on the UI section 20 of the image forming device 10 which has been invalidated.

The remote operation section 32 may validate an operation corresponding to the range of a drawn image drawn by the specific drawing input operation on the screen of the display section of the UI section 28, among the at least one operation on the UI section 20 of the image forming device 10 which has been invalidated. The term "drawn image" refers to an image prepared by a drawing input operation. For example, in the case where a drawing input operation of encircling an object with a specific figure (e.g. a circle) is performed, an image of the circle corresponds to the drawn image. In another example, in the case where a drawing input operation of drawing an arrow is performed, a figure of the arrow corresponds to the drawn image.

The remote operation section 32 may validate an operation corresponding to a range encircled by the drawn image. For example, the remote operation section 32 may validate an operation for a button image included in the range encircled by the drawn image, among plural button images displayed on the screen. Examples of the button image included in the range encircled by the drawn image include a button image internally included in the drawn image. Such a button image may be a button image that partially overlaps the drawn image, or a button image completely encircled by the drawn image. A button image, the number of pixels of which included in the range encircled by the drawn image is equal to or more than a threshold set in advance, may be treated as the button image included in the range encircled by the drawn image.

The image forming system according to the exemplary embodiment will be described in detail below.

Figure 4:
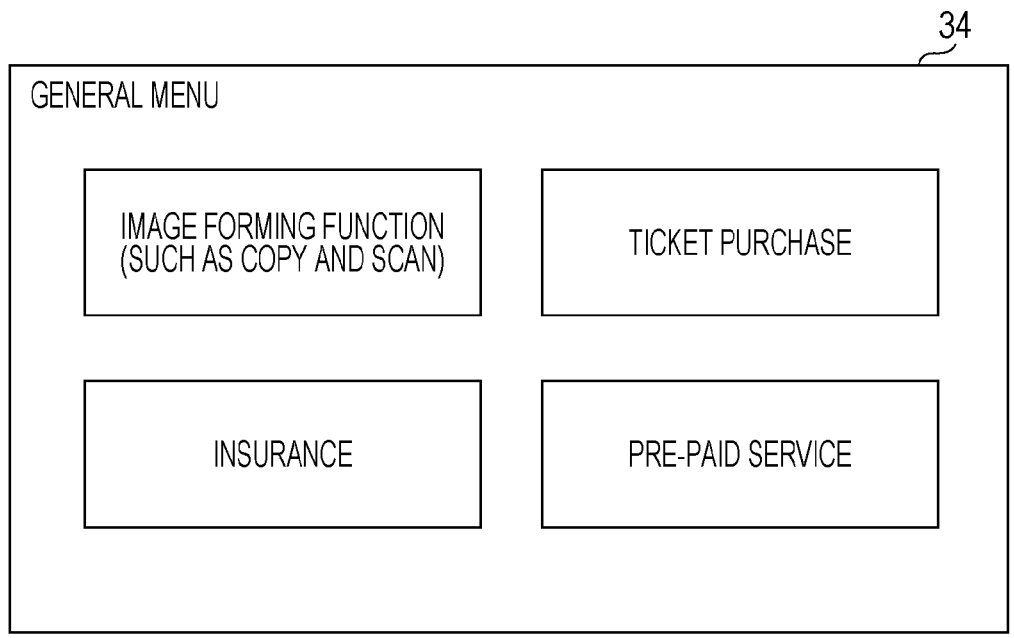
FIG. 4 illustrates an example of a general menu screen.

First, the screen displayed on the UI section 20 of the image forming device 10 will be described in detail. FIG. 4 illustrates a general menu screen 34 that serves as an example of the screen. The general menu screen 34 is a principal menu screen (e.g. a topmost screen), and the controller 22 of the image forming device 10 causes the UI section 20 to display the general menu screen 34 as the initial screen, for example. The general menu screen 34 includes, as displayed thereon, a button image (e.g. an icon) for designating the image forming function and button images (e.g. icons) for designating other services, for example. As a matter of course, the information displayed on the general menu screen 34 is merely exemplary, and the general menu screen 34 may include other information as displayed thereon, or a part of the information in the illustration may not be displayed.

Figure 5:
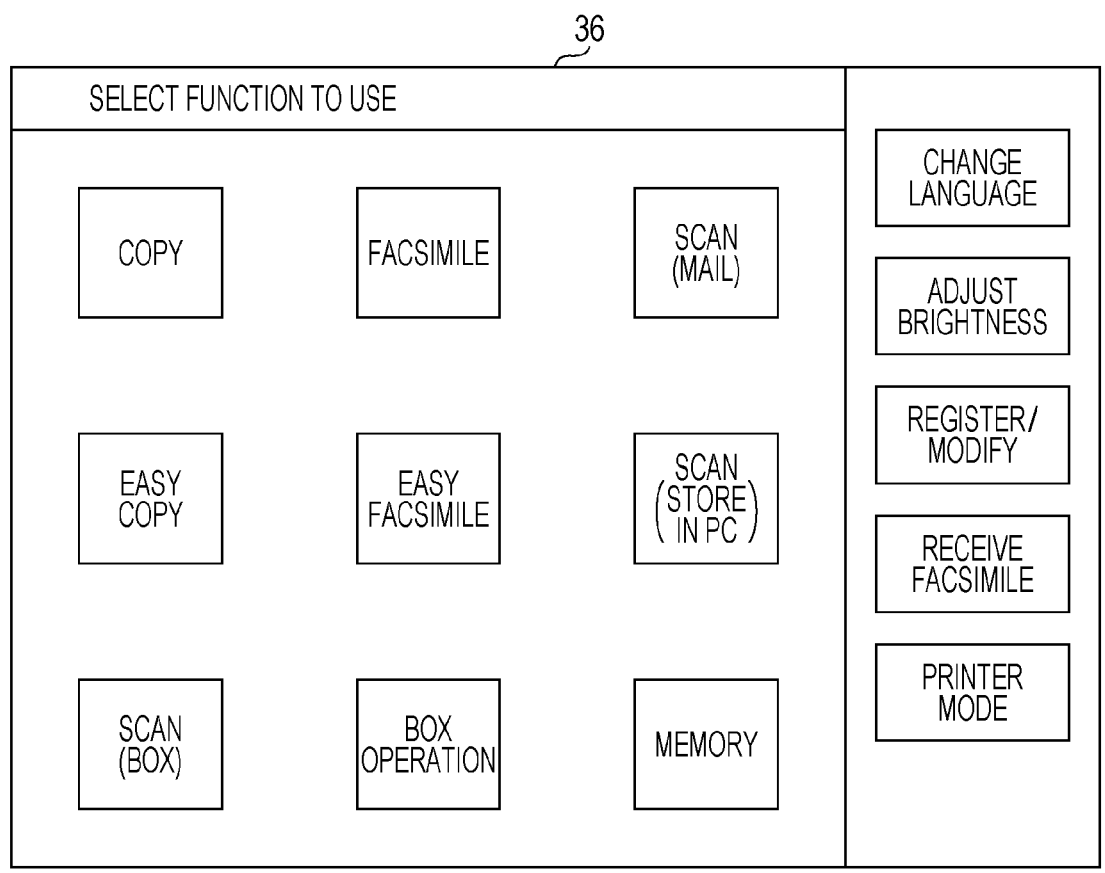
FIG. 5 illustrates an example of a function selection screen.

FIG. 5 illustrates a function selection screen 36 as another example of the screen. For example, when the button image for selecting the image forming function is pressed by the user on the general menu screen 34, the controller 22 of the image forming device 10 causes the UI section 20 to display the function selection screen 36. That is, the screen transitions from the general menu screen 34 to the function selection screen 36. The function selection screen 36 includes, as displayed thereon, button images (e.g. icons) for designating individual image forming functions (e.g. the copy function, the print function, the scan function, and the facsimile function). When a button image is pressed by the user, the controller 22 of the image forming device 10 causes the UI section 20 to display a screen for setting a function corresponding to the button image. The information displayed on the function selection screen 36 is merely exemplary, and the function selection screen 36 may include information about other functions as displayed thereon, or a part of the information in the illustration may not be displayed. When another button image is pressed by the user on the general menu screen 34, a screen corresponding to the button image is displayed on the UI section 20.

Figure 6:
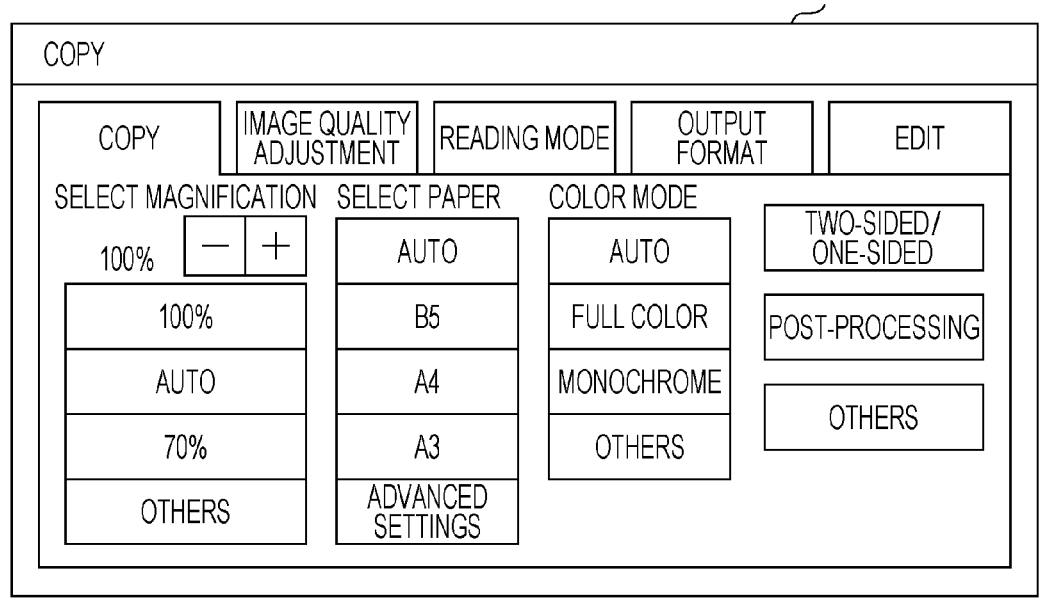
FIG. 6 illustrates an example of a copy setting screen.

FIG. 6 illustrates a copy setting screen 38 as another example of the screen. When a button image corresponding to the copy function is pressed by the user on the function selection screen 36, for example, the controller 22 of the image forming device 10 causes the UI section 20 to display the copy setting screen 38. That is, the screen transitions from the function selection screen 36 to the copy setting screen 38. Setting items about copying are displayed on the copy setting screen 38. Setting for copying is made on the copy setting screen 38. When an instruction for copying is provided by the user, the image forming device 10 executes copying. In the case where a button image corresponding to an image forming function other than the copy function is pressed by the user, a setting screen corresponding to the designated image forming function is displayed on the UI section 20, and setting for the image forming function is made on the setting screen.

In the remote communication state, the screen (e.g. the general menu screen 34, the function selection screen 36, the copy setting screen 38, etc.) displayed on the UI section 20 of the image forming device 10 is shared by the terminal device 12. That is, in the case where the screen is displayed on the UI section 20 of the image forming device 10, data on the screen are transmitted from the image forming device 10 to the terminal device 12, and the remote operation section 32 of the terminal device 12 causes the UI section 28 of the terminal device 12 to display the screen. Consequently, the screen is shared by the image forming device 10 and the terminal device 12.

In the example described above, the general menu screen 34 corresponds to the principal menu screen (e.g. a topmost screen), and the function selection screen 36 corresponds to a screen that is subordinate to the general menu screen 34. However, the function selection screen 36 may be the principal menu screen. In this case, the general menu screen 34 is not displayed on the UI section 20, and the function selection screen 36 is displayed on the UI section 20 as the initial screen.

Figure 7:
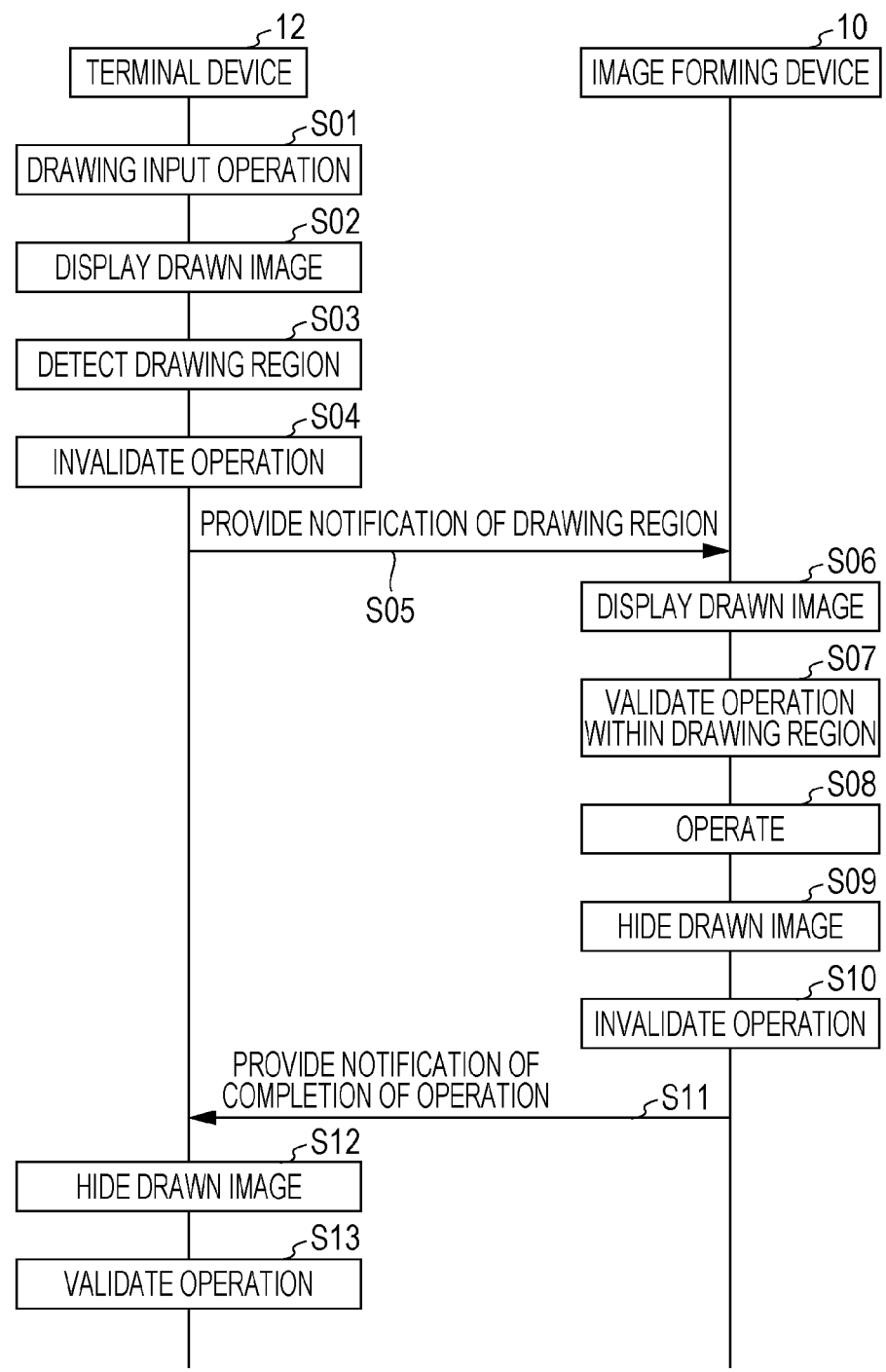
FIG. 7 is a sequence diagram illustrating an example of a process performed by the image forming system according to the exemplary embodiment.

A process performed by the image forming system according to the exemplary embodiment will be described below with reference to FIG. 7. FIG. 7 is a sequence diagram illustrating the process.

By way of example, it is assumed that the user (e.g. a customer) of the image forming device 10 and the user (e.g. an operator at the customer center) of the terminal device 12 are having a conversation with each other by telephone or through a video conference system, and that the image forming device 10 and the terminal device 12 are remotely communicating with each other. In addition, it is assumed that, in the remote communication state, the terminal device 12 has the authority to operate the UI section 20 of the image forming device 10 and the image forming device 10 does not have the authority to operate the UI section 20 of the image forming device 10 itself. That is, it is assumed that operations of the image forming device 10 through the UI section 28 of the terminal device 12 are valid, and that operations of the image forming device 10 through the UI section 20 of the image forming device 10 are invalid. A case where the operation authority for a specific operation is transferred from the terminal device 12 to the image forming device 10 in this state will be described below. That is, a case where a specific operation, among the at least one operation on the UI section 20 of the image forming device 10 which has been invalidated, is validated will be described.

It is assumed that the function selection screen 36, for example, is displayed on the UI section 20 of the image forming device 10. In the remote communication state, the same screen as the function selection screen 36, or a screen prepared by customizing the function selection screen 36, is displayed on the UI section 28 of the terminal device 12. In this situation, the user (e.g. an operator at the customer center) of the terminal device 12 performs a specific drawing input operation for a region (e.g. a button image, an input field, etc.) corresponding to an operation, the authority for which is to be transferred, on the screen displayed on the UI section 28 of the terminal device 12 (S01). That is, the user (e.g. an operator) performs a specific drawing input operation for a region (e.g. a button image, an input field, etc.) corresponding to an operation that should be validated on the image forming device 10. Examples of the specific drawing input operation includes encircling a button image, an input field, or the like with a figure such as a circle and an ellipse, and designating a button image, an input field, or the like with a figure such as a line and an arrow.

When a drawing input operation is performed, the controller 30 of the terminal device 12 prepares a drawn image matching the drawing input operation, and causes the UI section 28 of the terminal device 12 to display the drawn image (S02). For example, a drawn image matching a figure such as a circle, an ellipse, a line, and an arrow is displayed on the UI section 28.

The remote operation section 32 detects a region drawn by the specific drawing input operation (S03), and invalidates operations on the UI section 28 of the terminal device 12 and corresponding to the drawing region (S04). Consequently, operations corresponding to the drawing region, among the at least one operation on the UI section 28 of the terminal device 12 which have been validated, are invalidated. That is, some of the operations on the UI section 28 are invalidated. For example, an operation for a button image, an input field, or the like encircled or designated by the drawing input operation is invalidated.

Next, the remote operation section 32 notifies the image forming device 10 of the detected drawing region (S05). For example, information that indicates the drawing region is transmitted from the terminal device 12 to the image forming device 10 via the communication path N. Examples of the information that indicates the drawing region include information that indicates the position of the drawing region on the screen and information that indicates the shape of the drawing region.

When information that indicates the drawing region is received from the terminal device 12, the controller 22 of the image forming device 10 causes the UI section 20 of the image forming device 10 to display a drawn image matching the drawing input operation in accordance with the information (e.g. information that indicates the position and the shape of the drawing region) (S06).

The controller 22 of the image forming device 10 validates operations on the UI section 20 of the image forming device 10 and corresponding to the drawing region (S07). Consequently, operations corresponding to the drawing region, among the at least one operation on the UI section 20 of the image forming device 10 which has been invalidated, are validated. That is, some of the operations on the UI section 20 are validated. For example, an operation for a button image, an input field, or the like encircled or designated by the drawing input operation is validated.

When the user (e.g. a customer) of the image forming device 10 performs an operation which has been validated (S08), a process or the like matching the operation is executed. When the operation is completed (when a process matching the operation is completed, for example), the controller 22 of the image forming device 10 hides the drawn image which has been displayed on the UI section 20 of the image forming device 10 (S09), and invalidates operations on the UI section 20 and corresponding to the drawing region (S10).

Next, the controller 22 of the image forming device 10 notifies the terminal device 12 of the completion of the operation (S11). For example, information that indicates the completion of the operation is transmitted from the image forming device 10 to the terminal device 12 via the communication path N.

When information that indicates the completion of the operation is received, the controller 30 of the terminal device 12 hides the drawn image which has been displayed on the UI section 28 of the terminal device 12 (S12), and validates operations on the UI section 28 and corresponding to the drawing region (S13).

Screen transition in the image forming device 10 and the terminal device 12 will be described in detail below.

Figure 8C:
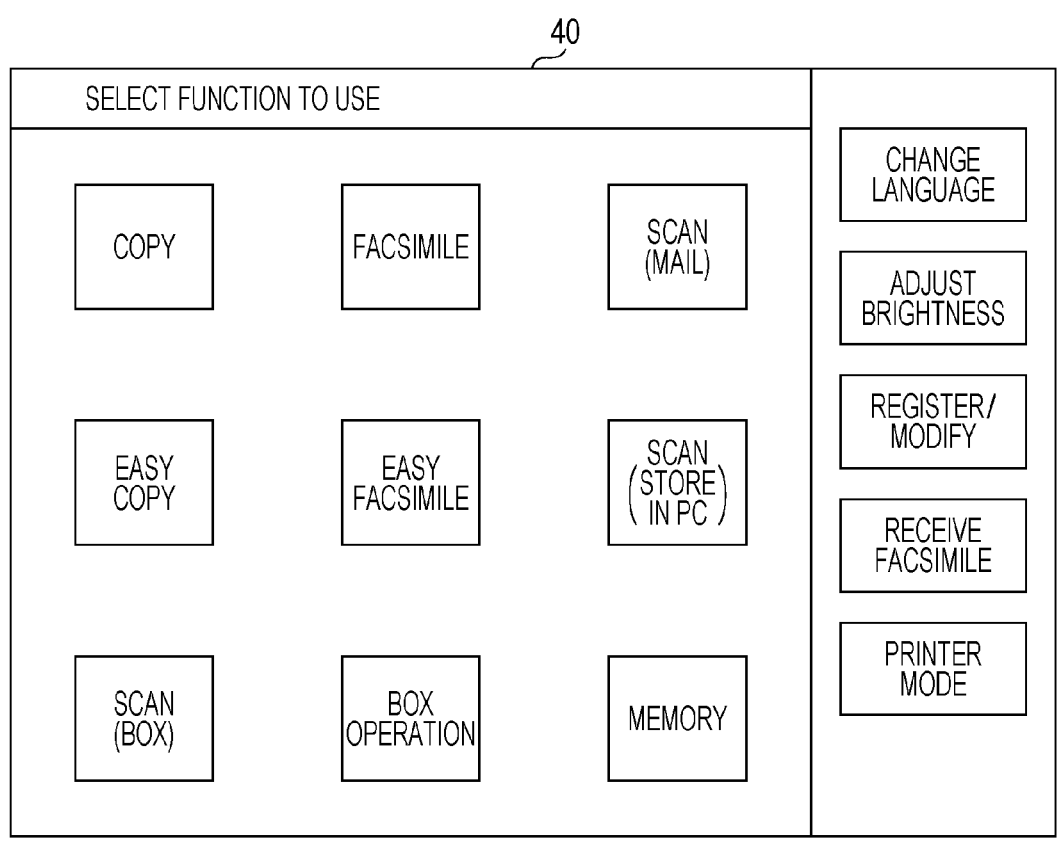
Figure 9C:
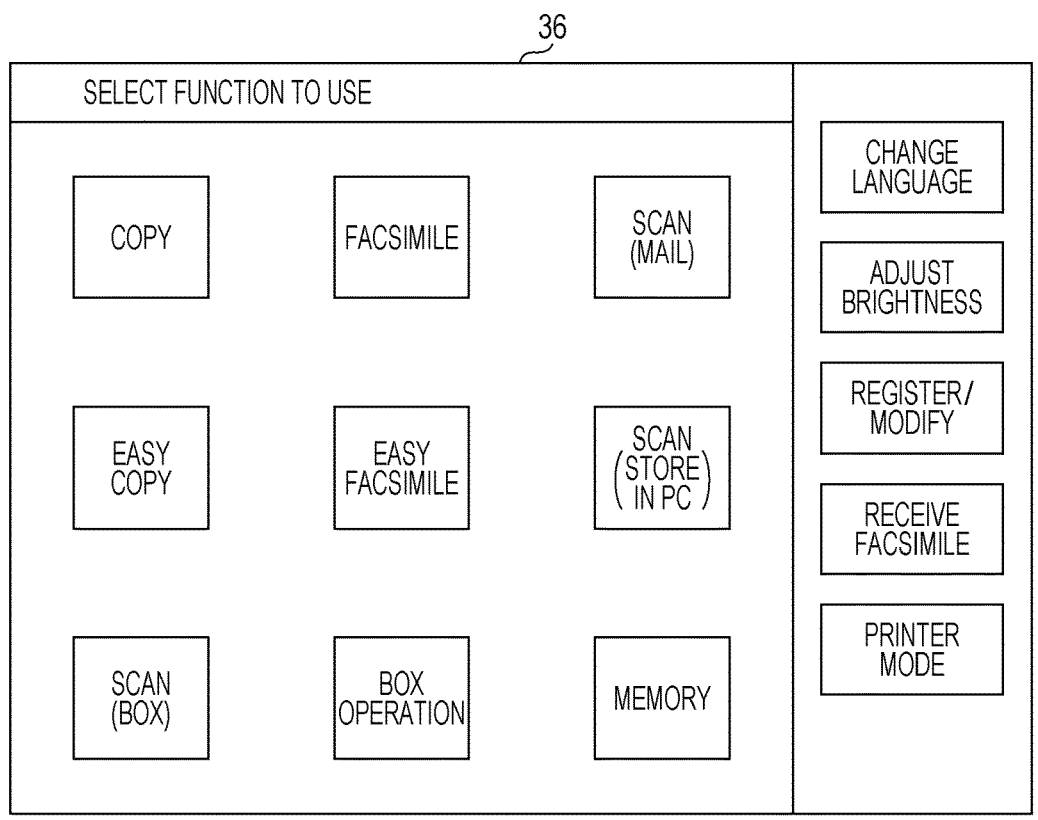

Screen transition for a case where the operation authority for a specific operation is transferred from the terminal device 12 to the image forming device 10 will be described with reference to FIGS. 8A to 8C and 9A to 9C. FIGS. 8A to 8C illustrate an example of screen transition in the terminal device 12. FIGS. 9A to 9C illustrate an example of screen transition in the image forming device 10.

As illustrated in FIG. 9A, the function selection screen 36 illustrated in FIG. 5 is displayed on the UI section 20 of the image forming device 10, for example. In the remote communication state, as illustrated in FIG. 8A, a function selection screen 40 is displayed on the UI section 28 of the terminal device 12. The function selection screen 40 is the same screen as the screen displayed on the image forming device 10. As a matter of course, a screen prepared by customizing the screen being displayed on the image forming device 10 for the terminal device 12 may be displayed on the terminal device 12. It is assumed that the terminal device 12 has the operation authority, and that the image forming device 10 does not have the operation authority.

The user (e.g. an operator at the customer center) of the terminal device 12 performs a specific drawing input operation for a region corresponding to an operation, the authority for which is to be transferred, on the function selection screen 40 displayed on the UI section 28 of the terminal device 12. In the example illustrated in FIG. 8A, a button image 42 for designating copying is selected as a region corresponding to an operation, the authority for which is to be transferred, and the button image 42 is encircled by a circular drawn image 44. The drawn image 44 is an image drawn in accordance with a specific drawing input operation by the user of the terminal device 12. The remote operation section 32 detects a region (drawing region) in which the drawn image 44 is drawn, and invalidates operations on the UI section 28 of the terminal device 12 and corresponding to the drawing region. In the example illustrated in FIG. 8A, the button image 42 for designating copying is encircled by the drawn image 44. Therefore, the remote operation section 32 invalidates operations for the button image 42 on the UI section 28 of the terminal device 12, and transfers the operation authority for the button image 42 from the terminal device 12 to the image forming device 10. Consequently, even if the user (e.g. an operator) presses or designates the button image 42 on the function selection screen 40 displayed on the UI section 28 of the terminal device 12, such an operation is invalid and may not be received. In addition, the remote operation section 32 displays information that indicates the transfer of the operation authority (e.g. information indicated by symbol 46) on the function selection screen 40. Examples of the information that indicates the transfer of the operation authority include display of a message saying "Client is operating." or the like.

Information that indicates the drawing region in which the drawn image 44 is drawn is transmitted from the terminal device 12 to the image forming device 10. As illustrated in FIG. 9B, a drawn image 48 corresponding to the drawn image 44 is displayed on the function selection screen 36 of the image forming device 10. The drawn image 48 has the same shape (e.g. a circular shape) as the drawn image 44, and is displayed on the function selection screen 36 at a display position corresponding to the display position of the drawn image 44 on the function selection screen 40, that is, at the same relative display position as the display position of the drawn image 44. In the terminal device 12, the button image 42 for copying is encircled by the drawn image 44. Therefore, also in the image forming device 10, a button image 50 for copying (an image corresponding to the button image 42) is encircled by the drawn image 48.

The controller 22 of the image forming device 10 validates operations for a region (drawing region) in which the drawn image 48 is drawn on the UI section 20 of the image forming device 10 under control by the remote operation section 32 of the terminal device 12. In the example illustrated in FIG. 9B, the button image 50 for copying is encircled by the drawn image 48. Therefore, the controller 22 validates an operation for the button image 50 on the UI section 20 of the image forming device 10. Consequently, if the user (e.g. a customer) presses or designates the button image 50 on the function selection screen 36 displayed on the UI section 20 of the image forming device 10, such an operation is valid and may be received. In addition, the controller 22 displays information indicating that operations for a region encircled by the drawn image 48 are valid (information indicated by symbol 52) on the function selection screen 36. Examples of such information include display of a message saying "You can operate encircled region." or the like.

The drawn image 48 displayed on the UI section 20 of the image forming device 10 may be colored or provided with a specific pattern in order to be distinguishable from other regions.

On the function selection screen 36, only operations for a region encircled by the drawn image 48 are valid, and operations for a region not encircled by the drawn image 48 are invalid. For example, if a button image for facsimile, a button image for scanning, or the like is pressed or designated by the user (e.g. a customer), such an operation is invalid and may not be received.

When the user (e.g. a customer) of the image forming device 10 performs an operation which has been validated (e.g. an operation for the button image 50), a process or the like matching the operation is executed. For example, copy setting, copying, or the like is performed. By way of example, when the button image 50 is pressed by the user, the screen displayed on the UI section 20 of the image forming device 10 transitions from the function selection screen 36 to the copy setting screen 38, and the copy setting screen 38 is displayed on the UI section 20. In addition, data on the same screen as the copy setting screen 38, or data on a screen prepared by customizing the copy setting screen 38, are transmitted from the image forming device 10 to the terminal device 12. Consequently, the same screen as the copy setting screen 38, or a screen prepared by customizing the copy setting screen 38, is displayed on the UI section 28 of the terminal device 12.

When copying is completed by the image forming device 10, for example, the controller 22 of the image forming device 10 hides the drawn image 48 as illustrated in FIG. 9C, and operations for a region encircled by the drawn image 48 are invalidated. In addition, information that indicates the completion of the copying is transmitted from the terminal device 12 to the image forming device 10.

When information that indicates the completion of the copying is received, the controller 30 of the terminal device 12 hides the drawn image 44 as illustrated in FIG. 8C, and validates operations for a region encircled by the drawn image 44 on the function selection screen 40.

In the exemplary embodiment, as has been described above, when a specific drawing input operation is detected in the terminal device 12, operations corresponding to the specific drawing input operation, among the at least one operation on the image forming device 10 which has been invalidated, are validated. Consequently, the operation authority for a specific operation is transferred from the terminal device 12 to the image forming device 10 to validate a specific operation in the image forming device 10 without performing a special operation.

The image forming system according to the exemplary embodiment is assumed to be used in the following scenes. For example, in the case where a user (e.g. a customer) of the image forming device 10 does not know how to operate the image forming device 10, it is assumed that the customer consults an operator at the customer center to receive an instruction. In this case, the operator remotely operates the image forming device 10 through the terminal device 12 to cause the image forming device 10 to display a screen (e.g. a function selection screen, a password input screen, and a billing screen) requested by the customer, and transfers the operation authority for a specific operation from the terminal device 12 to the image forming device 10 by performing a specific drawing input operation when the screen is displayed. Consequently, a specific operation performed by the customer on the image forming device 10 is validated. For example, the customer selects a specific function on the function selection screen, inputs a password on the password input screen, or performs an operation that is necessary for a billing process, or an operation that is executed to trigger a billing process, on the billing screen. In the case where the operation is completed, the operation authority is transferred from the image forming device 10 to the terminal device 12, and the operator performs subsequent operations (e.g. an operation that is troublesome to the customer, a complicated operation, and an operation that should be performed by the operator). In the exemplary embodiment, a specific operation is set to be valid in the image forming device 10 without performing an operation other than a drawing input operation (e.g. a button operation) in such scenes.

In the case where the terminal device 12 has the operation authority, when an operation is performed on the UI section 28 of the terminal device 12, such an operation is received. For example, when the user (e.g. an operator) of the terminal device 12 presses the button image 42 for copying with the function selection screen 40 displayed on the UI section 28 of the terminal device 12 as illustrated in FIG. 8A, such an operation is received as being valid, and a process (e.g. copy setting or copying) matching the operation (remote operation), a screen transition, or the like is performed. In the exemplary embodiment, in the case where an operation other than a specific drawing input operation is detected on the UI section 28 of the terminal device 12, the remote operation section 32 does not transfer the operation authority from the terminal device 12 to the image forming device 10.

For example, information that indicates a specific drawing input operation is stored in the storage section 26 of the terminal device 12. Examples of the specific drawing input operation include an operation of encircling a region with a circle, an ellipse, a rectangle, or the like and an operation of drawing a line (such as a straight line, a polygonal line, a curve, and an arrow) having a length equal to or more than a length set in advance (i.e. an operation of drawing a line that is continuous over a length set in advance or more).

For example, in the case where a certain region is encircled by a circle, an ellipse, or the like, such an operation of drawing a circle, an ellipse, or the like is detected as a specific drawing input operation, and an operation corresponding to the region is detected as an operation, the authority for which is to be transferred. A description is made with reference to a specific example. In the case where a button image is encircled by a circle, an ellipse, or the like as illustrated in FIG. 8A, such an operation of drawing a circle, an ellipse, or the like is detected as a specific drawing input operation, and an operation corresponding to the button image is detected as an operation, the authority for which is to be transferred.

As another example, in the case where a line having a length equal to or more than a length set in advance is drawn so as to cross a certain region (e.g. a button image), that is, a line having a length equal to or more than a length set in advance is drawn as superimposed on a certain region (e.g. a button image), such an operation of drawing a line may be detected as a specific drawing input operation, and an operation corresponding to the region (e.g. a button image) may be detected as an operation, the authority for which is to be transferred.

As still another example, in the case where a line having a length equal to or more than a length set in advance is drawn, such an operation of drawing a line may be detected as a specific drawing input operation, and an operation corresponding to a region (e.g. a button image) included in a range set in advance with reference to the line may be detected as an operation, the authority for which is to be transferred. For example, in the case where an underscore is drawn for a certain region (e.g. a button image), an operation corresponding to the region (e.g. a button image) is detected as an operation, the authority for which is to be transferred.

Meanwhile, an operation of drawing a line having a length less than a length set in advance, an operation of drawing only a single point, an operation of drawing a line that does not encircle a region, and so forth are not examples of the specific drawing input operation. Even if one of such operations is detected, the operation authority corresponding to the operation is not transferred from the terminal device 12 to the image forming device 10. As a matter of course, one or more of such operations may be detected as a specific drawing input operation, and the operation authority corresponding to the operation may be transferred from the terminal device 12 to the image forming device 10.

As has been described above, by distinguishably detecting a specific drawing input operation and other drawing input operations, an operation authority transfer process and a remote operation by the terminal device 12 are distinguished from each other.

As another example, a non-authority-transferring drawing mode and an authority-transferring drawing mode may be provided for the terminal device 12. In the non-authority-transferring drawing mode, the operation authority is not transferred, and a drawn image corresponding to a drawing input operation is displayed. That is, in the case where a drawing input operation is performed on the UI section 28 of the terminal device 12, the controller 30 of the terminal device 12 causes the UI section 28 to display a drawn image corresponding to the drawing input operation. In addition, a drawn image corresponding to the drawn image is displayed on the UI section 20 of the image forming device 10. The operation authority corresponding to the drawing input operation is not transferred to the image forming device 10. The non-authority-transferring drawing mode is executed when the user (e.g. an operator) of the terminal device 12 tells the user (e.g. a customer) of the image forming device 10 what position to operate (e.g. which button to press), for example.

In the authority-transferring drawing mode, as in the exemplary embodiment discussed above, a drawn image corresponding to a drawing input operation is displayed on the terminal device 12 and the image forming device 10, and the operation authority corresponding to a specific drawing input operation is transferred from the terminal device 12 to the image forming device 10.

Switching between the non-authority-transferring drawing mode and the authority-transferring drawing mode is made by the user (e.g. an operator) of the terminal device 12, for example. The mode may be distinguished by displaying different drawn images for the non-authority-transferring drawing mode and the authority-transferring drawing mode on the UI section 28 of the terminal device 12. For example, drawn images with different colors, shapes, etc. may be displayed for the non-authority-transferring drawing mode and the authority-transferring drawing mode.

As still another example, a drawing mode and a non-drawing mode may be provided for the terminal device 12. In the drawing mode, a remote operation for the image forming device 10 by the terminal device 12 is prohibited, and the operation authority corresponding to a specific drawing input operation is transferred from the terminal device 12 to the image forming device 10. In the non-drawing mode, transfer of the operation authority corresponding to a specific drawing input operation is prohibited, and a remote operation on the image forming device 10 by the terminal device 12 is permitted. Switching between the drawing mode and the non-drawing mode is made by the user (e.g. an operator) of the terminal device 12, for example.

Modifications of an operation authority transfer process will be described below. In Modifications 1 to 4 described below, by way of example, the function selection screen 36 is displayed on the UI section 20 of the image forming device 10, and the same function selection screen 40 as the function selection screen 36 is displayed on the UI section 28 of the terminal device 12. In addition, it is assumed that the terminal device 12 has the operation authority, and that the image forming device 10 does not have the operation authority.

(Modification 1)

Figure 10:
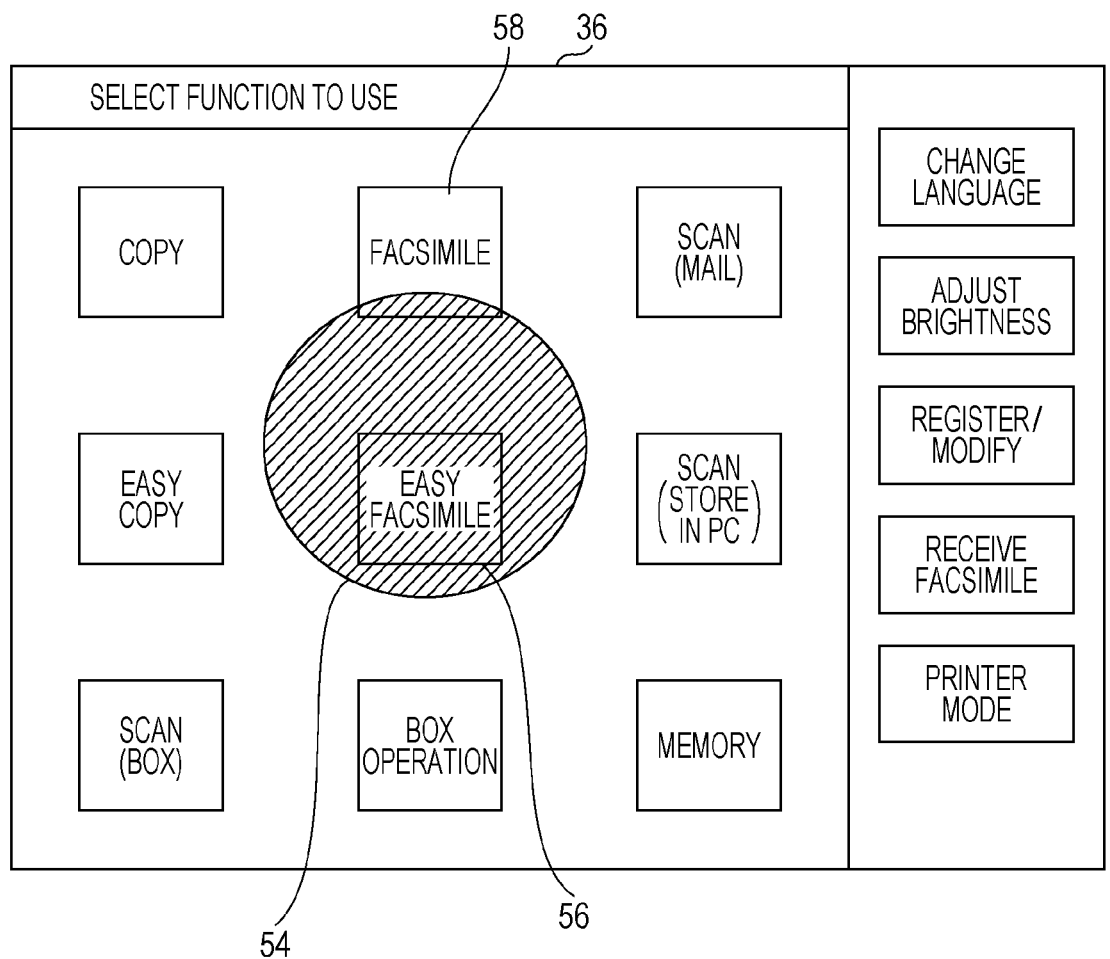
FIG. 10 illustrates an example of a screen of the image forming device.

An operation authority transfer process according to Modification 1 will be described with reference to FIG. 10. FIG. 10 illustrates an example of a screen displayed on the image forming device 10.

When a specific drawing input operation is performed on the function selection screen 40 displayed on the UI section 28 of the terminal device 12, as illustrated in FIG. 10, a drawn image 54 corresponding to an image drawn by the drawing input operation is displayed on the function selection screen 36 of the image forming device 10. By way of example, the drawn image 54 which represents an ellipse is displayed. In Modification 1, an operation for a range encircled by the drawn image 54 itself is validated on the UI section 20 of the image forming device 10. By way of example, a button image 56 is completely encircled by the drawn image 54. That is, the drawn image 54 encompasses the entire button image 56. In this case, an operation for the button image 56 is validated. A function called "easy facsimile" is assigned to the button image 56, and an instruction to execute the "easy facsimile" function is provided by pressing the button image 56. In addition, a part of a button image 58 for executing a "facsimile" function is included in the range encircled by the drawn image 54. In this case, an operation for the button image 58 may be validated since a part of the button image 58 is encircled by the drawn image 54, or an operation for the button image 58 may be invalidated since only a part of the button image 58 is encircled by the drawn image 54.

The range encircled by the drawn image 54 may be displayed in a different color from those of the other ranges so that the range encircled by the drawn image 54 is distinguishable from the other ranges. That is, the range, an operation in which is validated, may be displayed in a different color from those of ranges, an operation in which is invalidated.

(Modification 2)

Figure 11:
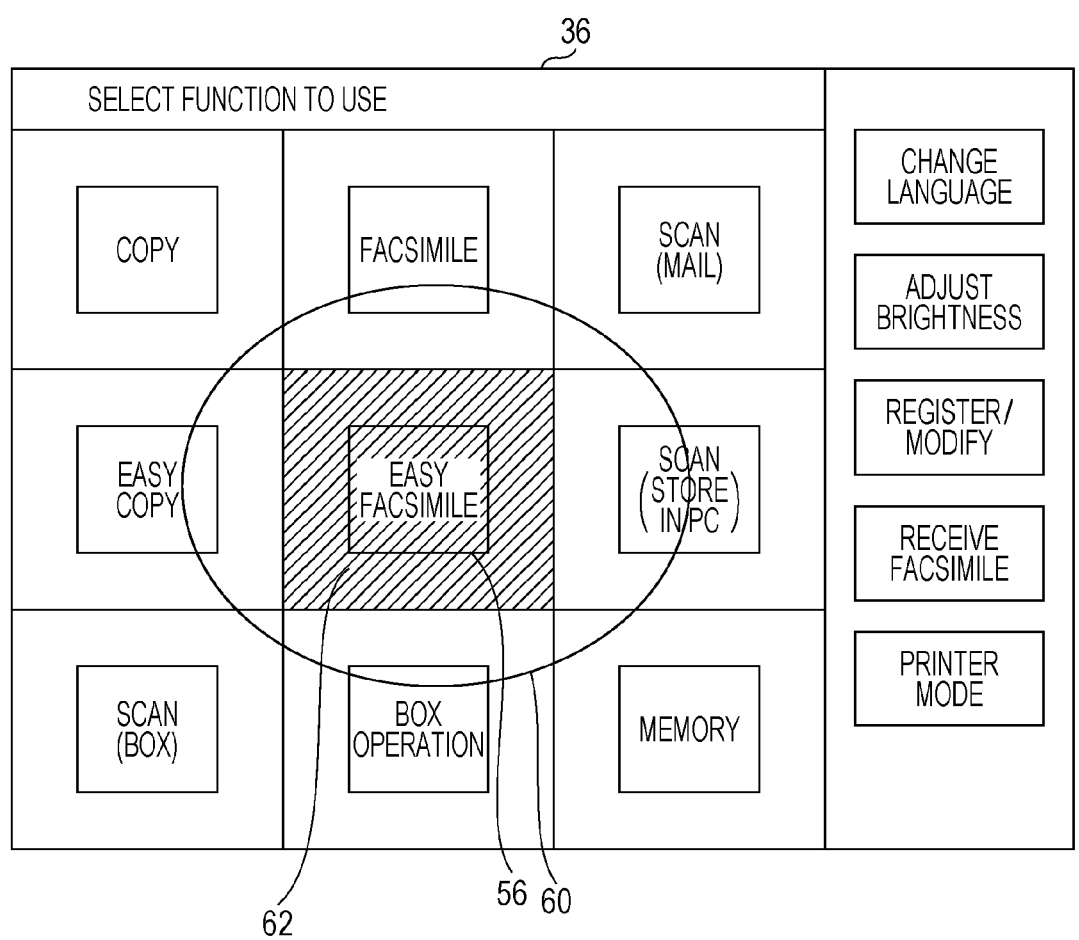
FIG. 11 illustrates an example of the screen of the image forming device.

An operation authority transfer process according to Modification 2 will be described with reference to FIG. 11. FIG. 11 illustrates an example of a screen displayed on the image forming device 10.

When a specific drawing input operation is performed on the function selection screen 40 displayed on the UI section 28 of the terminal device 12, as illustrated in FIG. 11, a drawn image 60 corresponding to an image drawn by the drawing input operation is displayed on the function selection screen 36 of the image forming device 10. By way of example, the drawn image 60 which is elliptical is displayed. In Modification 2, button regions are assigned to button images on the function selection screen 36. The button regions are regions that internally include the corresponding button images. By way of example, the button regions have a rectangular shape. As a matter of course, the button regions may have a shape having a curve. In the case where an operation on the UI section 20 of the image forming device 10 is validated, an operation for a region within a button region that internally includes the button image is received as an operation for the button image even if the button image itself is not operated, for example. For example, a rectangular button region 62 that internally includes the button image 56 is assigned to the button image 56 for executing the "easy facsimile" function. In the case where an operation for the button image 56 on the UI section 20 of the image forming device 10 is validated, an operation for a region within the button region 62 is received as an operation for the button image 56 even if the button image 56 itself is not operated.

In Modification 2, in the case where the entire button region is encircled by a drawn image, that is, a drawn image encompasses the entire button region, an operation for the button region is validated on the UI section 20 of the image forming device 10. In the example illustrated in FIG. 11, the button region 62 corresponding to the button image 56 is completely encircled by the drawn image 60. That is, the entire button region 62 is encompassed by the drawn image 60. In this case, an operation for the button region 62, that is, an operation for the button image 56, is validated on the UI section 20 of the image forming device 10. On the other hand, a button region to which a "facsimile" function is assigned, a button region to which an "easy copy" function is assigned, a button region to which a "scan (store in PC)" function is assigned, and a button region to which a "box operation" function is assigned are only partially encompassed by the drawn image 60. In this case, an operation for such button regions are invalidated on the UI section 20 of the image forming device 10.

The button region completely encircled by the drawn image 60 (the button region, the entirety of which is encircled by the drawn image 60) may be displayed in a different color from those of the other button regions so that the button region completely encircled by the drawn image 60 is distinguishable from the other button regions. That is, the button region, an operation in which is validated, may be displayed in a different color from those of button regions, an operation in which is invalidated.

(Modification 3)

Figure 12:
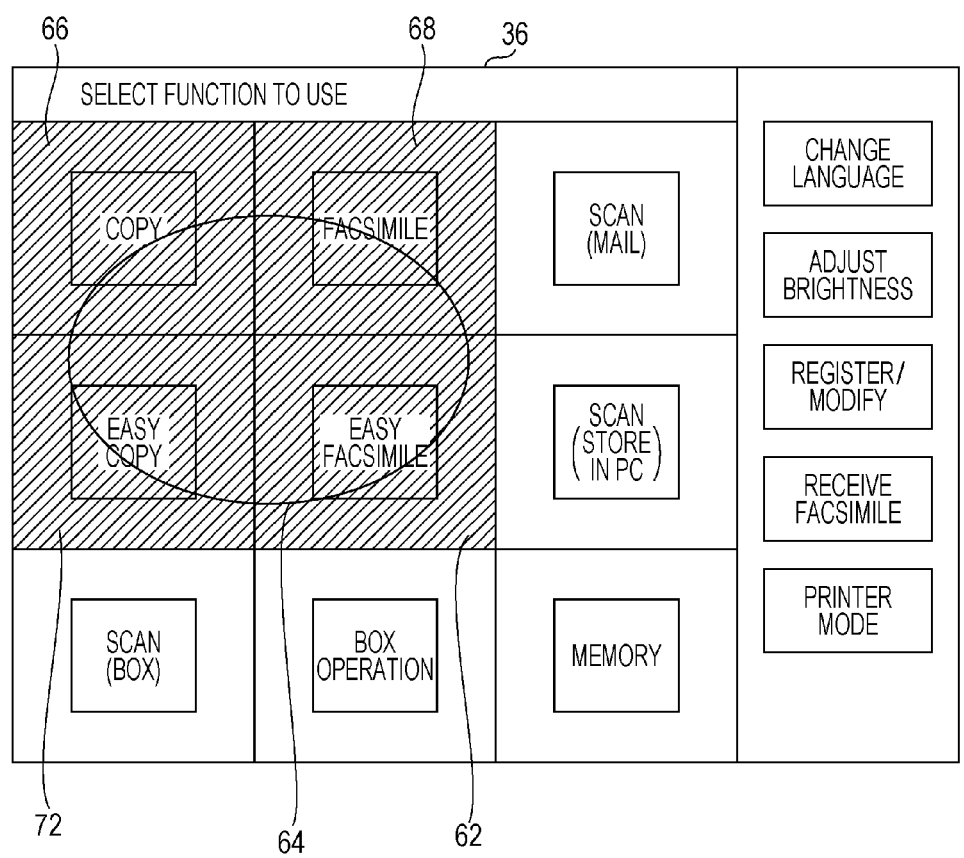
FIG. 12 illustrates an example of the screen of the image forming device.

An operation authority transfer process according to Modification 3 will be described with reference to FIG. 12. FIG. 12 illustrates an example of a screen displayed on the image forming device 10.

When a specific drawing input operation is performed on the function selection screen 40 displayed on the UI section 28 of the terminal device 12, as illustrated in FIG. 12, a drawn image 64 corresponding to an image drawn by the drawing input operation is displayed on the function selection screen 36 of the image forming device 10. By way of example, the drawn image 64 which is elliptical is displayed. In Modification 3, as in Modification 2, button regions are assigned to button images on the function selection screen 36, and an operation for a region within a button region is received as an operation for a button image corresponding to the button region.

In Modification 3, in the case where at least a part of a button region is encircled by a drawn image, that is, a drawn image encompasses at least a part of a button region, an operation for the button region is validated on the UI section 20 of the image forming device 10. In the example illustrated in FIG. 12, a part of each of button regions 62, 66, 68, and 70 is included in the drawn image 64. In this case, an operation for each of the button regions 62, 66, 68, and 70 is validated. That is, an operation for respective button images corresponding to the button regions 62, 66, 68, and 70 is validated. In the example illustrated in FIG. 12, an operation for a button image for executing the "easy facsimile" function as a button image corresponding to the button region 62, a button image for executing the "copy" function as a button image corresponding to the button region 66, a button image for executing the "facsimile" function as a button image corresponding to the button region 68, and a button image for executing the "easy copy" function as a button image corresponding to the button region 70 is validated on the UI section 20 of the image forming device 10.

An operation for a button region, the number of pixels in which included in the range surrounded by the drawn image 64 is equal to or more than a threshold set in advance, may be set to be valid, and an operation for a button region, such a number of pixels in which is less than the threshold, may be set to be invalid.

The button region at least partially encircled by the drawn image 64 may be displayed in a different color from those of the other button regions so that the button region at least partially encircled by the drawn image 64 is distinguishable from the other button regions. That is, the button region, an operation in which is validated, may be displayed in a different color from those of button regions, an operation in which is invalidated.

(Modification 4)

Figure 13:
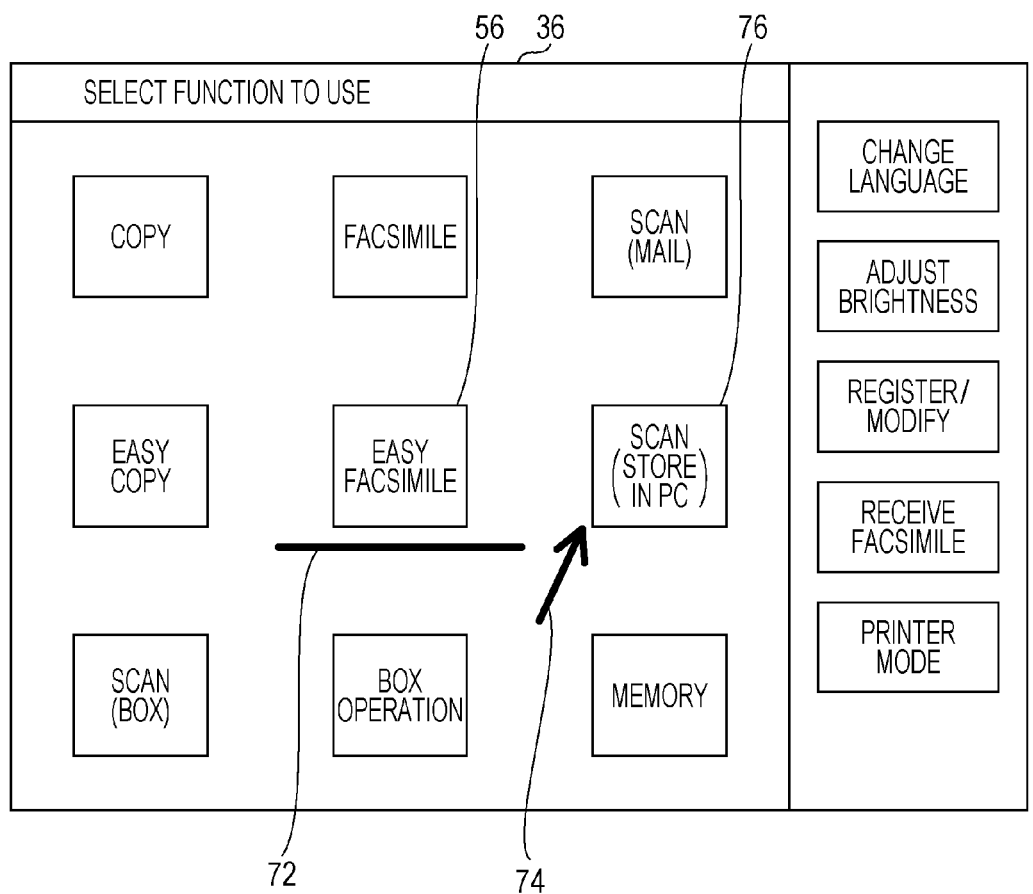
FIG. 13 illustrates an example of the screen of the image forming device.

An operation authority transfer process according to Modification 4 will be described with reference to FIG. 13. FIG. 13 illustrates an example of a screen displayed on the image forming device 10.

When a specific drawing input operation is performed on the function selection screen 40 displayed on the UI section 28 of the terminal device 12, as illustrated in FIG. 13, a drawn image 72 corresponding to an image drawn by the drawing input operation is displayed on the function selection screen 36 of the image forming device 10. By way of example, the drawn image 72 which represents a straight line is displayed. In the case where the length of the line represented by the drawn image 72 is equal to or more than a length set in advance, an operation of drawing the drawn image 72 is detected as a specific drawing input operation, and an operation for a button image displayed within a range set in advance with reference to the drawn image 72 is validated. In the example illustrated in FIG. 13, an operation for the button image 56 is validated. In another example, an operation for a button image that crosses the drawn image 72 which represents a straight line may be set to be valid. For example, in the case where the drawn image 72 is drawn as superimposed on the button image 56, an operation for the button image 56 may be set to be valid.

In FIG. 13, as another example, a drawn image 74 that represents an arrow is illustrated, and an operation for a button image designated by the arrow (a button image pointed by the arrow) may be set to be valid. In the example illustrated in FIG. 13, a button image 76 is designated by the arrow, and an operation for the button image 76 is validated.

Also in Modification 4, the range or the button image, an operation for which is validated, may be displayed in a different color from those of ranges or button images, an operation for which is invalidated.

(Modification 5)

Figure 14:
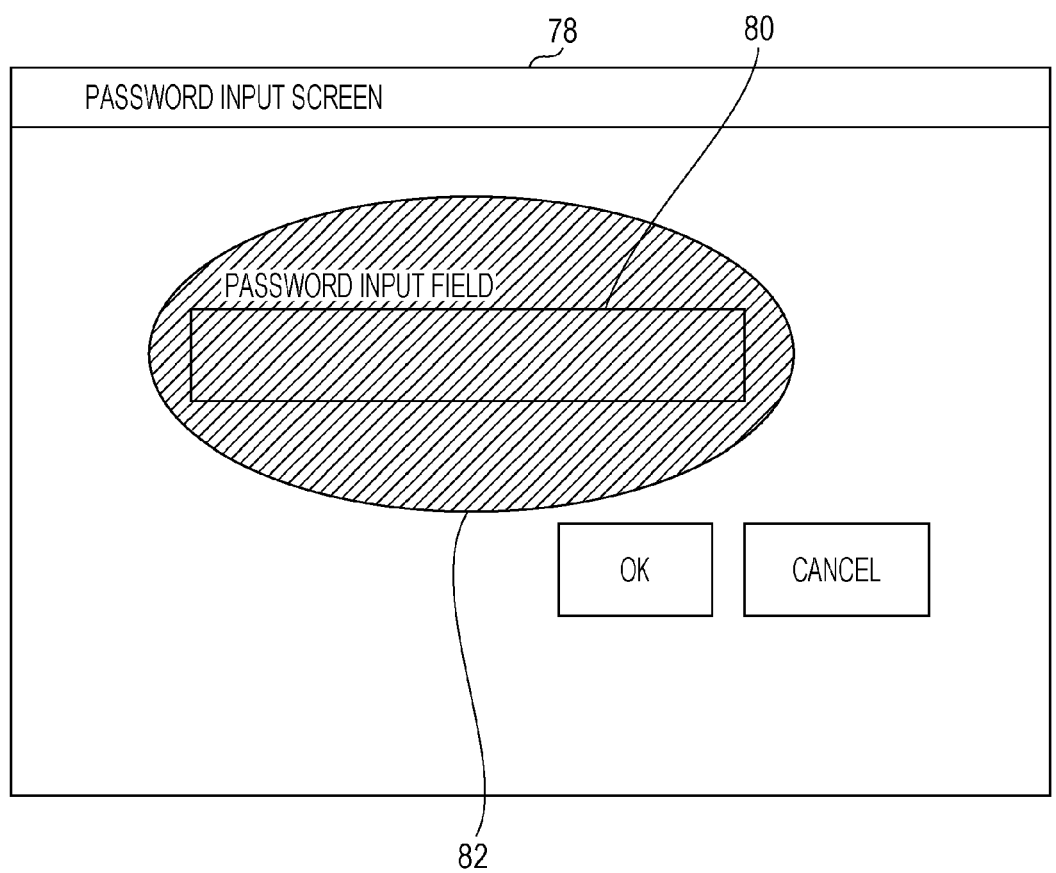
FIG. 14 illustrates an example of the screen of the image forming device.

An operation authority transfer process according to Modification 5 will be described with reference to FIG. 14. FIG. 14 illustrates an example of a screen displayed on the image forming device 10.

In Modification 5, by way of example, a password input screen 78 is displayed on the UI section 20 of the image forming device 10, and the same password input screen, or a customized password input screen, is displayed on the UI section 28 of the terminal device 12. In addition, the terminal device 12 has the operation authority, and the image forming device 10 does not have the operation authority. A password input field 80 is displayed on the password input screen 78, and the user (e.g. a customer) of the image forming device 10 inputs a password into the password input field 80.

When a specific drawing input operation is performed on the password input screen (a screen corresponding to the password input screen 78) displayed on the UI section 28 of the terminal device 12, as illustrated in FIG. 14, a drawn image 82 corresponding to an image drawn by the drawing input operation is displayed on the password input screen 78 of the image forming device 10. By way of example, the drawn image 82 which represents an ellipse is displayed. In Modification 5, an operation for a range encircled by the drawn image 82 itself is validated. By way of example, the password input field 80 is completely encircled by the drawn image 82. That is, the drawn image 82 encompasses the entire password input field 80. In this case, an operation for the password input field 80 is validated. In another example, in the case where at least a part of the password input field 80 is encircled by the drawn image 82, an operation for the password input field 80 may be validated.

Also in Modification 5, the range or the input field, an operation for which is validated, may be displayed in a different color from those of ranges or input fields, an operation for which is invalidated.

(Modification 6)

Figure 15:
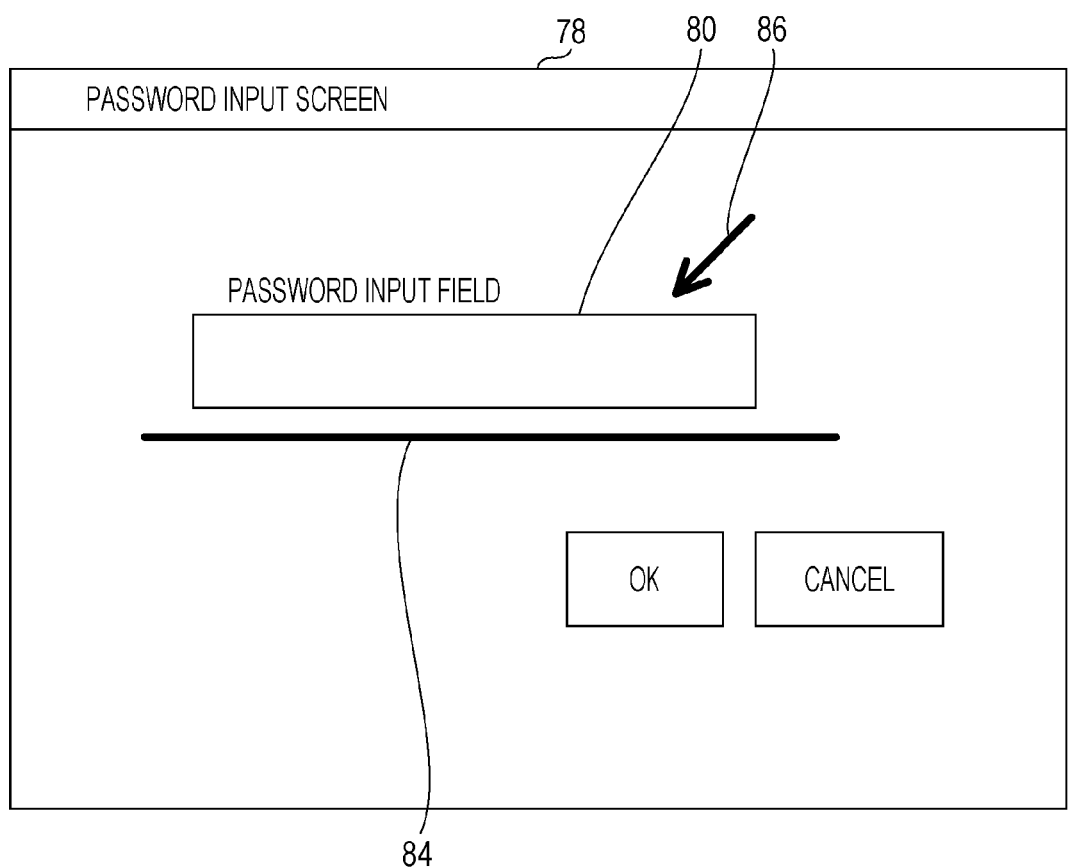
FIG. 15 illustrates an example of the screen of the image forming device.

An operation authority transfer process according to Modification 6 will be described with reference to FIG. 15. FIG. 15 illustrates an example of a screen displayed on the image forming device 10.

In Modification 6, as in Modification 5, a password input screen 78 is displayed on the UI section 20 of the image forming device 10, and the same password input screen, or a customized password input screen, is displayed on the UI section 28 of the terminal device 12. In addition, the terminal device 12 has the operation authority, and the image forming device 10 does not have the operation authority.

When a specific drawing input operation is performed on the password input screen displayed on the UI section 28 of the terminal device 12, as illustrated in FIG. 15, a drawn image 84 corresponding to an image drawn by the drawing input operation is displayed on the password input screen 78 of the image forming device 10. By way of example, the drawn image 84 which represents a straight line is displayed.

In the case where the length of the line represented by the drawn image 84 is equal to or more than a length set in advance, an operation of drawing the drawn image 84 is detected as a specific drawing input operation, and an operation for a range displayed within a range set in advance with reference to the drawn image 84 is validated. In the example illustrated in FIG. 15, an operation for the password input field 80 is validated. In another example, an operation for a button image or an input field that crosses the drawn image 84 which represents a straight line may be set to be valid. For example, in the case where the drawn image 84 is drawn as superimposed on the password input field 80, an operation for the password input field 80 may be set to be valid.

In FIG. 15, as another example, a drawn image 86 that represents an arrow is illustrated, and an operation for an input field designated by the arrow (an input field pointed by the arrow) may be set to be valid. In the example illustrated in FIG. 15, the password input field 80 is designated by the arrow, and an operation for the password input field 80 is validated.

Also in Modification 6, the range or the button image, an operation for which is validated, may be displayed in a different color from those of ranges or button images, an operation for which is invalidated.

In an example other than the password input field, an input field for a billing process may be displayed, and an operation for the input field may be validated by a drawing input operation, for example.

(Modification 7)

Figure 16:
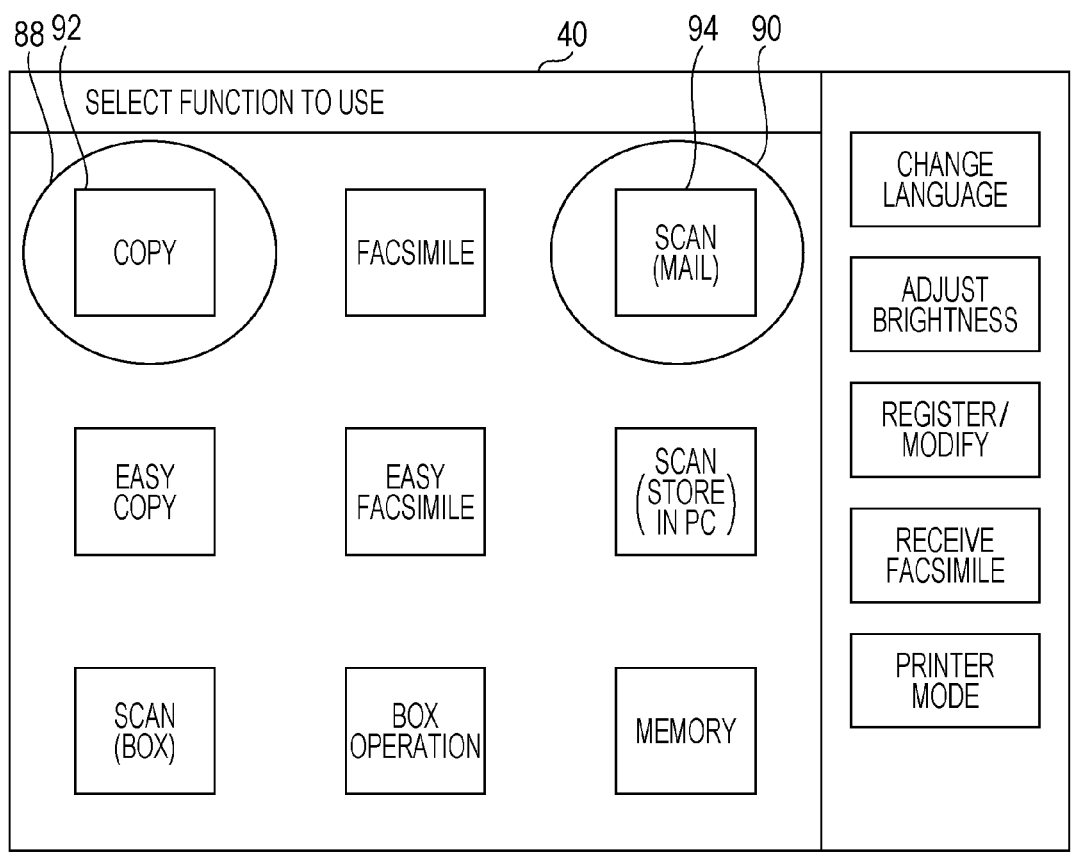
FIG. 16 illustrates an example of a screen of the terminal device.

An operation authority transfer process according to Modification 7 will be described with reference to FIG. 16. FIG. 16 illustrates an example of a screen displayed on the terminal device 12.

As in Modification 1, the function selection screen 36 is displayed on the UI section 20 of the image forming device 10, and the same function selection screen 40 as the function selection screen 36 is displayed on the UI section 28 of the terminal device 12. In addition, it is assumed that the terminal device 12 has the operation authority, and that the image forming device 10 does not have the operation authority.

In Modification 7, the controller 30 of the terminal device 12 includes a function of detecting a drawing input operation for the screen of the display section of the UI section 28. In this case, the controller 30 functions as an example of the detection unit. The controller 30 detects the start and the end of a drawing input operation, for example. Examples of the start of a drawing input operation include the time when contact of an operator (e.g. a finger of the user or a stylus) with the screen of the display section of the UI section 28. The end of a drawing input operation may be the time when the operator is brought out of contact with the screen or the time when a drag operation by the operator is not detected.

For example, in the case where a time set in advance has elapsed after the end of a specific drawing input operation is detected by the controller 30, the remote operation section 32 validates an operation corresponding to the specific drawing input operation, among the at least one operation on the UI section 20 of the image forming device 10 which has been invalidated. For example, in the case where plural drawn images are prepared by plural drawing input operations, operations for ranges corresponding to the drawing input operations are set to be valid on the UI section 20 of the image forming device 10 after a time set in advance has elapsed since the last drawn image is prepared. In this case, in the case where a new drawing input operation is detected within the time set in advance after a drawing input operation is detected by the controller 30, the remote operation section 32 does not validate, but maintains as being invalid, operations for ranges corresponding to the drawing input operations on the UI section 20 of the image forming device 10. In the case where a time set in advance has elapsed after the end of a new drawing input operation is detected, the remote operation section 32 validates an operation for a range corresponding to a specific drawing input operation, among the at least one operation on the UI section 20 of the image forming device 10 which has been invalidated.

A specific example will be described with reference to FIG. 16. For example, it is assumed that a specific drawing input operation is performed on the function selection screen 40 displayed on the UI section 28 of the terminal device 12, and that drawn images 88 and 90 are drawn. The drawn images 88 and 90 are each an image that represents a circle. For a more detailed description, first, a drawing input operation for drawing a drawn image 88 is performed, and the start and the end of the drawing input operation are detected. In the case where the start of a drawing input operation for drawing the drawn image 90 is detected before a time set in advance elapses after drawing of the drawn image 88 is ended, that is, after the end of such drawing is detected, the remote operation section 32 does not validate, but maintains as being invalid, an operation for a range corresponding to the drawn image 88 (e.g. an operation for a button image 92) on the UI section 20 of the image forming device 10. In the case where a time set in advance has elapsed after drawing of the drawn image 90 is ended, that is, after the end of such drawing is detected, the remote operation section 32 validates an operation for a range corresponding to the drawn image 88 (e.g. an operation for the button image 92) and an operation for a range corresponding to the drawn image 90 (e.g. an operation for the button image 94) on the UI section 20 of the image forming device 10. In the case where a new drawing input operation for drawing a new drawn image is detected before a time set in advance elapses after drawing of the drawn image 90 is ended, on the other hand, the remote operation section 32 does not validate, but maintains as being invalid, an operation for a range corresponding to each of the drawn images 88 and 90 (e.g. operations for the button images 92 and 94) on the UI section 20 of the image forming device 10.

As has been described above, in the case where plural drawing input operations are performed, operations corresponding to the drawing input operations are collectively set to be valid on the UI section 20 of the image forming device 10 after a time set in advance has elapsed since the end of the last drawing input operation is detected.

(Modification 8)

Figure 17:
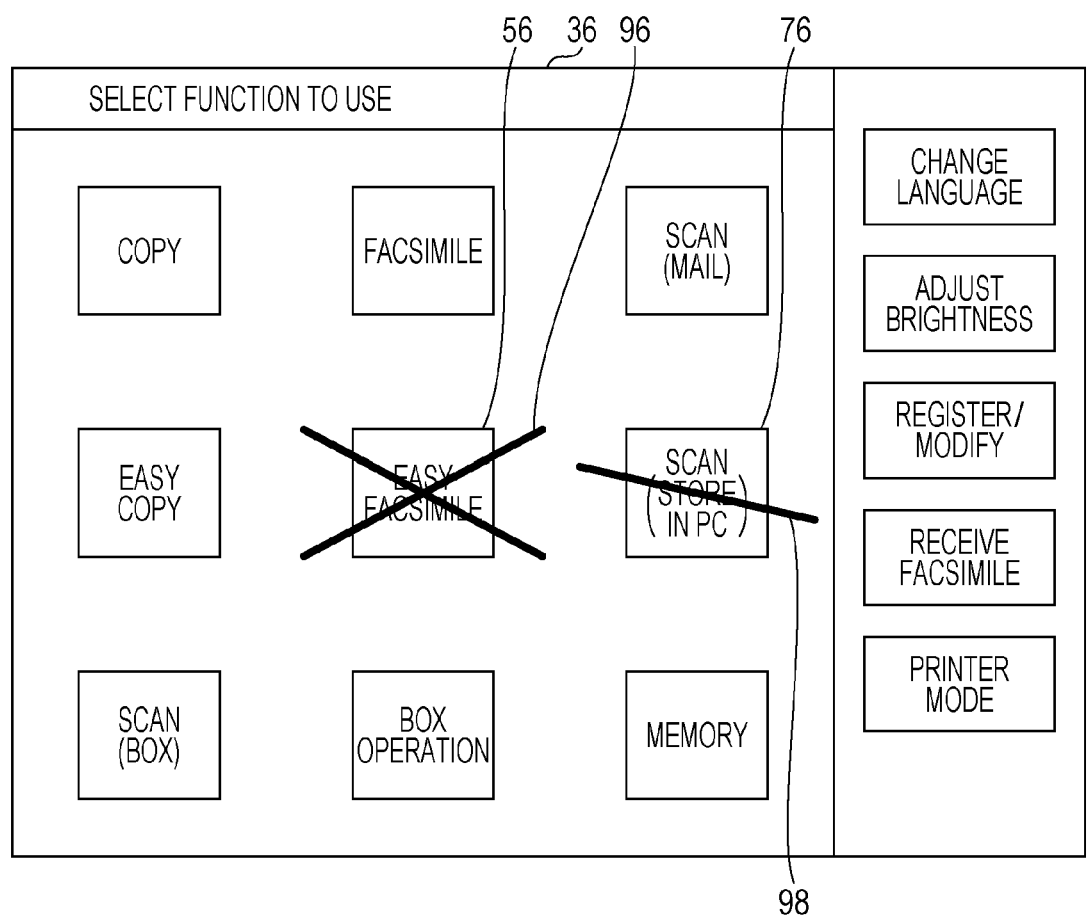
FIG. 17 illustrates an example of the screen of the image forming device.

An operation authority transfer process according to Modification 8 will be described with reference to FIG. 17. FIG. 17 illustrates an example of a screen displayed on the image forming device 10.

In the exemplary embodiment and modifications discussed above, when a specific drawing input operation is performed on the terminal device 12 in the case where the terminal device 12 has the operation authority and the image forming device 10 does not have the operation authority, an operation for a range corresponding to the specific drawing input operation is set to be valid on the UI section 20 of the image forming device 10.

In Modification 8, on the contrary, when a specific drawing input operation is performed on the terminal device 12 in the case where the image forming device 10 has the operation authority, an operation for a range corresponding to the specific drawing input operation is set to be invalid on the UI section 20 of the image forming device 10.

For example, when a drawn image that represents an x mark is drawn on the function selection screen 40 of the terminal device 12 as illustrated in FIG. 17, a drawn image 96 corresponding to the drawn image is displayed on the function selection screen 36 of the image forming device 10. In this case, an operation for a range corresponding to the drawn image 96 may be set to be invalid on the UI section 20 of the image forming device 10. In the example illustrated in FIG. 17, the drawn image 96 is drawn on the button image 56, and thus an operation for the button image 56 is set to be invalid. In another example, in the case where a drawn image 98 that represents a straight line is drawn, an operation for a range corresponding to the drawn image 98 may be set to be invalid on the UI section 20 of the image forming device 10. In the example illustrated in FIG. 17, the drawn image 98 is drawn on the button image 76, and thus an operation for the button image 76 is set to be invalid.

Also in the case where a range corresponding to a specific drawing input operation is invalidated on the UI section 20 of the image forming device 10 as in Modification 8, specific operations are individually set to be valid or invalid.

In the exemplary embodiment and modifications discussed above, in the case where a drawing input operation is performed and an operation for a range corresponding to the drawing input operation is set to be valid on the UI section 20 of the image forming device 10, an operation for the range is set to be invalid on the UI section 28 of the terminal device 12. In another example, even if a drawing input operation is performed on the terminal device 12, an operation for a range corresponding to the drawing input operation may be maintained as being valid on the UI section 28 of the terminal device 12. That is, the operation authority for a range corresponding to a drawing input operation may not be completely transferred from the terminal device 12 to the image forming device 10, and an operation for the range may be set to be valid on both the terminal device 12 and the image forming device 10.

In addition, in another modification, images that represent software keys that represent the hardware keys provided on the UI section 20 of the image forming device 10 may be displayed on the UI section 28 of the terminal device 12, and the remote operation section 32 of the terminal device 12 may have a function of remotely operating the hardware keys of the image forming device 10. When a specific drawing input operation is performed for a specific range of an image that represents a software key displayed on the UI section 28 of the terminal device 12 in a state in which operations on hardware keys of the image forming device 10 are invalid, an operation for a portion of the hardware keys of the image forming device 10 corresponding to the specific range (a range corresponding to the specific drawing input operation) may be set to be valid.

In the exemplary embodiment and modifications described above, the image forming system that includes the image forming device 10 and the terminal device 12 has been described above. However, the process related to the transfer of the operation authority through a drawing input operation may be applied to systems that include a device other than the image forming device 10.

Each of the image forming device 10 and the terminal device 12 is implemented through cooperation between hardware resources and software, by way of example. Specifically, each of the image forming device 10 and the terminal device 12 includes one or more processors such as central processing units (CPUs) (not illustrated). The one or more processors read and execute a program stored in a storage device (not illustrated) to implement the functions of the various components of the image forming device 10 and the terminal device 12. The program is stored in the storage device by way of a storage medium such as a CD and a DVD, or by way of a communication path such as a network. In another example, the various components of each of the image forming device 10 and the terminal device 12 may be implemented by hardware resources such as a processor and an electronic circuit. For implementation, a device such as a memory may be utilized. In another example, the various components of each of the image forming device 10 and the terminal device 12 may be implemented by a digital signal processor (DSP) and a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
a first display; and
a processor programmed to:
remotely operate a second display of an external device while the external device does not have authority to operate the second display, and
transfer partial operational authority over the second display to the external device in response to an input on the first display, which invalidates operational authority over the second display via the first display and validates partial operational authority to permit operation over part of the external device using the second display.

2. The apparatus according to claim 1,
wherein the input on the first display is a drawing input, and
wherein, in a case where the drawing input is performed on the first display at a predetermined position, the remote operation unit validates partial operational authority to control only a first operation of the external device by the external device and invalidates operational authority to control the first operation of the external device by the apparatus.

3. The apparatus according to claim 1,
wherein the input on the first display is a drawing input,
wherein different areas of the first display represent different operations of the external device including a first operation, and
wherein, in a case where the drawing input is performed on the first display in an area representing control of the first operation of the external device, the remote operation unit validates partial operational authority of the external device to control only the first operation when the operational authority of the external device to control the first operation was previously invalidated.

4. The apparatus according to claim 3,
wherein the drawing input encircles an area on the first display representing control of the first operation.

5. The apparatus according to claim 4,
wherein the first display is configured to display a screen comprising a plurality of button images that represent different functions of the external device including the function of the first operation, wherein the second display displays the same screen, and
the remote operation unit validates partial operational authority of the external device to control only a function thereof whose corresponding button image is encircled on the first display by the drawing input.

6. The apparatus according to claim 1, wherein the input is a drawing input, and the apparatus further comprising:
a detector that detects the drawing input,
wherein, in a case where a time set in advance has elapsed after an end of the drawing input is detected by the detector, the remote operation unit transfers partial operational authority to control only the first operation from the external device to the apparatus.

7. The apparatus according to claim 6,
wherein, in a case where a new drawing input is detected within the time set in advance after the drawing input is detected by the detector, the remote operation unit maintains the operational authority to control the first operation at the external device.

8. A non-transitory computer readable medium storing a program causing a computer having a processor and to which a display is connected to function as:
a display controller that causes the display, which receives an input operation, to display information; and
a remote operation unit to
remotely operate a second display of an external device while the external device does not have authority to operate the external device, and
transfer partial operational authority over the second display to the external device in response to an input on the first display, which invalidates operational authority over the second display via the first display and validates partial operational authority to permit operation over part of the external device using the second display.

* * * * *